United States Patent
McDonnell et al.

(10) Patent No.: US 12,321,913 B2
(45) Date of Patent: Jun. 3, 2025

(54) GOLF SYSTEMS AND METHODS USING DIGITAL ASSETS

(71) Applicant: Cobra Golf Incorporated, Carlsbad, CA (US)

(72) Inventors: Michael T. McDonnell, Carlsbad, CA (US); Bryce W. Hobbs, Carlsbad, CA (US); Ryan L. Roach, Encinitas, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 196 days.

(21) Appl. No.: 17/885,878

(22) Filed: Aug. 11, 2022

(65) Prior Publication Data

US 2024/0095700 A1 Mar. 21, 2024

(51) Int. Cl.
*G06Q 30/00* (2023.01)
*A63F 13/69* (2014.01)
*A63F 13/812* (2014.01)
*G06Q 20/12* (2012.01)

(52) U.S. Cl.
CPC ......... *G06Q 20/1235* (2013.01); *A63F 13/69* (2014.09); *A63F 13/812* (2014.09)

(58) Field of Classification Search
CPC .... G06Q 20/1235; A63F 13/69; A63F 13/812
See application file for complete search history.

(56) References Cited

U.S. PATENT DOCUMENTS

| | | | |
|---|---|---|---|
| 8,636,603 B2 | 1/2014 | Rauchholz | |
| 8,641,546 B2 | 2/2014 | Rauchholz | |
| 8,641,547 B2 | 2/2014 | Rauchholz | |
| 8,641,548 B2 | 2/2014 | Rauchholz et al. | |
| 9,195,781 B2 | 11/2015 | Savarese et al. | |
| 9,427,639 B2 | 8/2016 | Rauchholz et al. | |
| 11,135,495 B2 | 10/2021 | Tuxen et al. | |
| 11,583,772 B1* | 2/2023 | Thacker | A63F 13/79 |
| 2012/0316843 A1* | 12/2012 | Beno | G06Q 10/0639 703/2 |
| 2014/0221118 A1 | 8/2014 | Meadows et al. | |
| 2016/0151861 A1* | 6/2016 | Soracco | A63B 60/42 219/76.12 |
| 2019/0070508 A1* | 3/2019 | Cotton | A63F 13/812 |
| 2021/0248594 A1* | 8/2021 | Yantis | H04L 9/50 |
| 2022/0366762 A1* | 11/2022 | Nelson | G07F 17/3244 |
| 2022/0383303 A1* | 12/2022 | Mullen | G06Q 20/389 |
| 2022/0414621 A1* | 12/2022 | Parlotto | G06F 21/64 |
| 2023/0161847 A1* | 5/2023 | Shida | H04L 9/3263 726/26 |

FOREIGN PATENT DOCUMENTS

EP 2803062 B1 6/2017

OTHER PUBLICATIONS

WarnerMedia: Turner Sports Debuts Flow Blockchain-Enabled Game on Mobile—Blocklete Golf Targeted News Service [Washington, D.C] Mar. 3, 2022; Dialog #2635232732, 2pgs. (Year: 2022).*

* cited by examiner

*Primary Examiner* — Robert M Pond
(74) *Attorney, Agent, or Firm* — Quarles & Brady LLP

(57) ABSTRACT

A method of providing benefits to owners of non-fungible tokens is provided. A minter of a non-fungible token corresponding to a digital asset can encourage or incentivize users of the non-fungible tokens to purchase additional non-fungible tokens, or perform transactions using a non-fungible token to receive benefits.

13 Claims, 9 Drawing Sheets

GOLF SYSTEMS AND METHODS USING DIGITAL ASSETS

BACKGROUND

Non-fungible tokens can represent products or digital assets with properties that can be integrated into applications and systems connected to a blockchain. Use of these tokens and integration with these systems can provide new methods for providing benefits to customers of a manufacturer or retailer. Secondary sales and other transactions using non-fungible tokens can further provide a revenue source to the minter of the non-fungible tokens.

Thus, there is a need to provide systems and methods for rewarding and incentivizing the use of non-fungible tokens by providing benefits to customers on the basis of their use of non-fungible tokens.

SUMMARY

In accordance with some embodiments of the disclosed subject matter, systems, methods, and media for golf club systems and methods using cryptographic tokens, e.g., non-fungible tokens, are provided.

In one aspect, a method of managing digital assets comprises generating a first digital asset. The first digital asset can be added to a distributed ledger. In a first transaction, ownership of the first digital asset can be transferred to a first purchasing party. In a second transaction, ownership of a product can be transferred to the first purchasing party. A digital representation of the first product can be generated, and the first digital asset can be updated to include this representation. A digital representation of a first benefit can be generated and associated to the first digital asset. The first benefit can be provided to the owner of the first digital asset.

In another aspect, a method of providing benefits to owners of a digital asset comprises providing a first digital asset having a plurality of properties. A first non-fungible token representing ownership of the first digital asset can be generated. The first non-fungible token can be transferred to a first digital wallet. A transaction can be performed including receiving information of the first digital wallet. The presence of the first non-fungible token in the first digital wallet can be confirmed. A first benefit can be provided based on a digital property of the first non-fungible token. The first digital asset can be updated with information about the first transaction.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
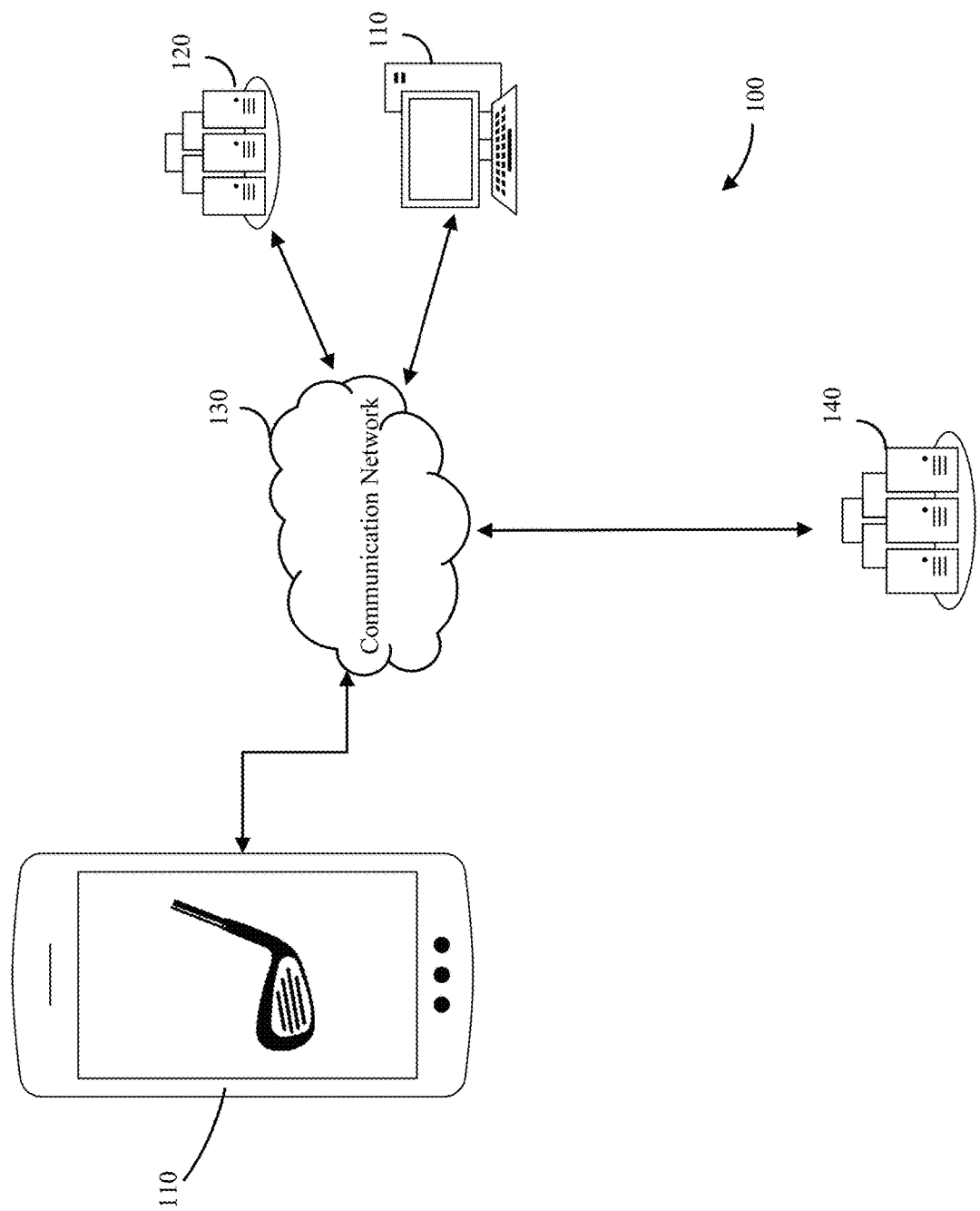
FIG. 1 depicts an example of a system for generating a non-fungible token in accordance with some embodiments of the disclosed subject matter.

The present application includes embodiments of mechanisms (e.g., systems, methods, and media) for generating digital assets secured by cryptographic tokens, e.g., non-fungible tokens (NFTs), and which correspond to physical objects (e.g., articles of apparel, or articles of footwear), or which correspond to a set of entitlements to digital systems, or which correspond to benefits which can be provided by a manufacturer or retailer, or which correspond to virtual objects in a video game or metaverse. In some embodiments, this disclosure relates to cryptographic digital assets for articles or objects, such as, e.g., tangible objects, including golf clubs, golf bags, footwear, apparel, headgear, or sporting gear, among other products, such as, e.g., watches, luggage, jewelry, storage or shipping containers, artwork, mobile phones or smartphones, tablets, televisions or other electronic devices, refrigerators or other appliances, and vehicles or other machines, or the articles or objects may be intangible objects, including graphic designs, virtual avatars or characters, graphic user interfaces, or other forms of communication.

Further, this disclosure relates to cryptographic digital assets that can be updated based on user activities and transactions, and methods for provisioning of such cryptographic digital assets and articles, and decentralized computing systems with attendant blockchain control logic for mining, exchanging, collaborating, modifying, combining, and/or blending blockchain-enabled digital assets and articles. The presently described technology relies on the trust established in and by blockchain technology to enable a company to control the creation, distribution, expression, and use of digital objects that represent their brand. Unlike typical digital assets that are freely reproducible without loss of content or quality, the use of discrete recordation of ownership via blockchain technology establishes an ownership of the digital asset, which may provide the owner of the NFT with certain rights, benefits, and entitlements that can be associated with ownership of the digital asset. The manufacturer of the NFT and the associated digital asset has the ability to control or limit the overall supply of the digital objects or traits/aspects thereof and may create a controlled scarcity if so desired. The present disclosure contemplates that, in some examples, the digital object may be representative of: a physical object offered for sale; a 2D or 3D design rendering or design file that may be suitable for future production; a virtual representation of an object that is not presently intended for physical creation/production; a proof of attendance at an event, or entitlement to attend an event; a representation of a users interactions or transactions with a manufacturer or retailer; or other such objects. Further, some embodiments of the present disclosure include mechanisms for generating cryptographic tokens using virtual reality (VR), augmented reality (AR), and/or graphical user interfaces (GUIs) on computing devices.

The present application further discloses mechanisms that bridge the divide between the physical world and the digital realm. For example, according to some embodiments of the present disclosure, individuals customize a digital product, mint an NFT of the digital product, and receive a physical product corresponding to both the digital product and the NFT. In some examples, individuals purchase a physical product, receive a digital product corresponding with the physical product, and an NFT is minted of the digital product. As another example, users may participate in a physical or virtual golf tournament, and may receive an NFT that is minted with metadata based on their performance data in the golf tournament. In yet another example, users can purchase an NFT that can be updated based on transactions of the user with the manufacturer or retailer, and can entitle the user to certain benefits and entitlements based on the transactions. In another example, users can earn NFTs based on their ownership of other NFTs or based on the properties of another NFT in their wallet. In yet another example, a user can purchase or earn an NFT to provide the user with access to a restricted part of a digital system, which can be a website, a video game, an AR environment, or a metaverse, and access to the restricted partition may further allow the user to obtain additional benefits.

In some embodiments, an NFT can be a token of ownership of a digital asset that represents a physical asset. For example, an NFT can represent ownership of a digital asset corresponding to a physical golf club. The digital asset can be a unique identifier for the golf club, or could alternatively contain descriptive attributes or properties of the golf club. Non-limiting examples of attributes included in the digital asset representing a golf club could include a manufacturing process used to make the golf club (e.g., 3DP, MIM, cast, forged, etc.), a club type (e.g., a driver, putter, wedge, and iron), a cosmetic attribute of the club, a right or left handedness of the club, a shaft length, a shaft flexibility, a shaft material etc.

In some embodiments, NFTs can secure, authenticate, or verify ownership of digital assets having different properties and different functions. A uniform resource identifier (URI) of an NFT can be a uniform resource locator (URL) pointing to a digital asset, or metadata associated with a digital asset that is hosted on a server of a host system. The metadata of a digital asset can further include a URL where the digital asset is hosted remotely, off-chain or off of the blockchain. For example, accessing a URI of a NFT representing a physical or digital golf club can include accessing the URI in a browser, and visually inspecting the attributes, which may be presented in a code-readable format (e.g., JSON, XML, HTML, etc.). A URI of a digital asset representing a golf club may return a list of attributes, as discussed above relating to the golf club, which could, in turn, be utilized by third party platforms (e.g., video game systems and digital marketplaces) to provide the owner of the digital asset some functionality or benefit. Other examples of NFTs could additionally or alternatively secure ownership of a digital asset including an image or design. For example, an NFT could authenticate ownership of a design that could be represented as an image hosted at the URI of the NFT, or in a URL of the metadata hosted at the URI. Ownership of both an NFT of a golf club and of an NFT for a design could entitle the owner to benefits, such as, for example, applying the design to a virtual golf club in a video game, or a metaverse, or could entitle the user to purchase a physical golf club having the design of the NFT.

In some embodiments, an NFT can function as a digital identity for an owner, and can provide access to digital markets, gateways, portals, APIs, games, or web pages which the owner would not otherwise be able to access. For example, an NFT can entitle the owner to access a webpage for a vendor that could provide the owner with access to exclusive benefits. In some embodiments, the benefits offered could be based on the type and metadata of an NFT. For example, an NFT could represent a digital golf club, and ownership of an NFT could entitle an owner to purchase a golf club having the same description as the digital golf club, or could entitle the owner to trade the NFT for a physical golf club, or could provide the user with a discount on a physical golf club having the same properties of the digital golf club.

By way of example, and not limitation, there are presented cryptographic digital assets that are provisioned through a blockchain ledger of transaction blocks and function, in part, to connect a real-world product, such as a physical golf club or set of clubs, to a virtual collectable, such as a digital golf club or set of clubs. As used herein, the term "user" is inclusive of a consumer, a purchaser, and a registered member of an online platform. When a consumer buys a genuine golf club, a digital representation of a club may be generated, linked with the consumer, and assigned a cryptographic token, where the digital club and cryptographic token collectively represent a club NFT. The digital representation may include a computer-generated avatar of a club or a limited-edition artist rendition of the club. The digital asset may be secured by an encryption-protected block that contains a hash pointer as a link to a related block in a decentralized blockchain, a transaction timestamp, and transaction data. Using the digital asset, the buyer is enabled to securely trade or sell the tangible club, trade or sell the digital club, store the non-fungible token representing ownership of the digital club in a cryptocurrency wallet or other digital blockchain wallet, and, based on rules of acceptable club manufacturability, create a custom, made-as-new, tangible club.

Further, users can develop a personal user account that is registered with the original manufacturer of the tangible golf clubs, e.g., a Cobra Fam account, which is linked to the user's cryptographic wallet and allows the user access to a platform for viewing, purchasing, selling, trading, minting, and burning digital assets and associated cryptographic tokens that may or may not be linked to or representative of tangible goods. Alternatively, the user may purchase or otherwise acquire a non-fungible token that represents an account, but may be transferable to another user.

As used herein, "cryptographic digital assets," or simply "digital assets" may refer to any computer-generated virtual object, including digital clubs, club sets, golfing gear, footwear, apparel, headgear, avatars, art, collectables, tickets, coins, creatures, or sub-elements thereof, etc., among other virtual objects, that have a unique, non-fungible tokenized code ("token") registered on and validated by a blockchain platform or otherwise registered in an immutable database. Additionally, a digital asset can be anything that can be stored in a memory or storage of a computer. Thus, for example, a database could be a digital asset, or an entry in the database can be a digital asset, or a file can be a digital asset, and each of these can also be associated with a non-fungible token. Further, the digital asset may include a digital-art version of a tangible, physical object or an object disassociated with tangible, physical objects. For example, the digital asset may include a digital-art version of physical golf clubs having the same or substantially the same appearance. Additionally or alternatively, the digital asset may be digital golf clubs generated within the digital realm and without being connected to or representative of physical golf clubs. Further, the digital asset may become physical through various techniques, such as by manufacturing methods based on aspects of the digital golf clubs that are taken as inputs to create the physical golf clubs.

A "smart contract" is an agreement that is in the form of a self-enforcing software program that runs on the blockchain network, so it is distributed across a blockchain network and is itself immutable. The terms within a smart contract, such as one in an NFT, are dictated by one or more of the parties. When creating a smart contract, a party or multiple parties may include programming to allow for negotiation, modification, full or partial acceptance, full or partial refusal, and, ultimately, full or partial enforcement or waiver. It will be appreciated that, as used herein, consideration is merely something of value given in exchange from one party to the other and may be real or personal property, such as, e.g., currency, or may be a return promise, an act, or forbearance. Additionally, options are contracts in which an offeree gives consideration for a promise by the offeror not to revoke an outstanding offer, and options can be provided as part of a larger contract or, alternatively, the option may be the foundation of the contract itself. A smart contract in an NFT may, but need not, be legally enforceable. The code of a smart contract can include functions for reading from or writing to the smart contract. For example, a smart contract can include a function that returns information about a digital asset, or a function returning information about an owner of a digital asset. Additionally or alternatively, a function of a smart contract could be called by an owner of the contract to distribute funds exchanged in the execution of the smart contract.

As used herein, the term "cryptographic token" is a digital value that is stored/recorded on a blockchain. Cryptographic tokens include payment tokens, such as coins (e.g., Bitcoin), utility tokens, security tokens, and "non-fungible tokens." As used herein, "non-fungible token" ("NFT") refers to a cryptoasset in the form of a unique, cryptographic token corresponding to a digital asset, which can include any of the examples of a digital asset listed above. The NFT may be a blockchain-based deed of digital ownership and/or certificate of authenticity of a digital asset. As used herein, an NFT is not a digital asset, but is used to signify ownership of the digital asset. The NFT can be built (i.e., minted) in accordance with contemporary and relevant standards, such as, e.g., an Ethereum Request for Comments (ERC) 721 (Non-Fungible Token Standard) or ERC1155 (Multi Token Standard) among other relevant standards and as appropriate for the particular blockchain network and applications used therewith. Further, an NFT is built or minted in accordance with the terms of a smart contract. The particular conditions and terms of a smart contract can govern details of a transaction involving the minting or transfer of an NFT, and the terms can impact the value or, at least, the perceived value of the NFT over time. For example, a smart contract can enforce a rarity of NFTs minted under the smart contract by limiting the maximum allowable number of NFTs which can be minted under the contract. In some cases, a smart contract can include terms mandating that a royalty be paid to the owner of the smart contract upon a secondary sale of an NFT. In essence, the NFT represents authentication of the transaction and serves as a record of this authentication on a blockchain ledger (e.g., Bitcoin, Ethereum, and the like). As such, the NFT itself may fluctuate in value depending on various aspects of the transaction, e.g., the parties involved, value exchanged, time and/or date, exclusivity, or combinations thereof, among other factors. Further, the number and/or frequency of transactions may also cause the NFT to fluctuate in value.

A digital asset can be accessible at a web address (i.e., the URI) that is referenced in the non-fungible token securing it. The web address can be a link which, when accessed, can serve the digital asset, or could serve information or metadata of the digital asset. Because of a cost associated with storing information in a non-fungible token, the token itself may contain only enough information to identify the digital asset and prove ownership, with the rest of the information about the digital asset residing on computer systems that are not themselves nodes in the blockchain. Accessing the web address can return a list of properties of the digital asset to the user through a graphical user interface, or, alternatively, in a format that is consumable by computer programs and applications that may access the digital asset. For example, the web address could return information about the digital asset in JSON format or XML format, and the address of the digital asset itself could be included in the list of properties. A digital asset representing a golf club could thus have properties specifying the type of club, a method of manufacturing used in making the club, a shaft length, a specification of handedness, a weight of the club, etc. In some cases, an address referenced in a non-fungible token could be an API endpoint that may vary information returned to the user, or implement a function based on the HTTP method through which the API endpoint is accessed. The API endpoint could allow a user or system to perform a GET, HEAD, PUT, or POST, for example, which could allow a digital property of the digital asset to be changed based on the operation performed. The GET and HEAD operations can be read-only operations, and can provide publicly available information about the digital asset without the need for authentication. Access to the write operations (e.g., POST, PUT) of the API endpoint referenced in an NFT can require authentication, and could thus only be accessible to the manufacturer of the NFT and digital asset, for example.

A "Uniform Resource Identifier" or "URI" is a unique sequence of characters that identifies a logical or physical resource used by web technologies. URIs may be used to identify any resource, including non-virtual objects, such as locations or people, or digital information resources, such as web pages. The URI can comprise a "Uniform Resource Name" ("URN") or a "Uniform Resource Locator" ("URL").

Some embodiments of the present disclosure are directed to digital assets that can include computer-generated virtual or digital collectables, such as digital golf clubs, or digital articles of apparel, e.g., jackets, shirts, pants, shorts, shoes, hats, necklaces, watches. According to some embodiments, the digital collectables may be secured and/or uniquely identified by a cryptographic token, e.g., an NFT. The digital asset may be linked and/or distributed with real-world, physical products, such as tangible golf clubs and/or tangible articles of apparel. The digital assets may be linked or distributed with a 2D or 3D design file such as a computer-aided design (CAD) model, graphical rendering, image, or drawings package from which a physical product may be constructed or otherwise represented.

Some embodiments of the present disclosure are directed to NFTs that, alternatively or additionally to representing physical or digital collectables, can authenticate ownership or entitlement to a benefit. A digital asset whose ownership is tied to an NFT, for example, could be a user's account with a manufacturer or retailer for example, which could include digital properties in the form of information about transactions made by the user, products purchased, dates of activities, cumulative totals of the value exchanged for goods or services, or any other information that could be associated with a customer account. Benefits may be accrued or provided based on the digital properties or information of the digital asset, and the benefits could include access to exclusive products or designs, access to limited-edition products, admission tickets to attend real or virtual events, discounts on products, access to digital systems, etc. Accounts provided as digital assets secured by NFTs may provide privacy benefits to individuals that may otherwise be averse to signing up for an account with a manufacturer or retailer, as purchases and activity could be associated to the NFT, without including identifying information about the user. Further, the ability to sell or transfer ownership of an account by transferring an account NFT can provide an incentive for a user to perform activities that could result in the provision of a benefit, as doing so can enhance the value of the NFT, which can correspond to a value of the digital asset secured by the NFT. Sales of an account or utility NFT can further provide a revenue stream to a manufacturer or retailer, as the originator of the NFT could receive a royalty or commission for any secondary sales of the NFT. In other embodiments, an NFT could represent entitlement to a benefit, including, for example, access to restricted portions of a web site, access to exclusive events or products, entitlements to discounts, entitlements to integration with third-party applications such as games, etc. The digital asset for such an NFT can include information about the benefit, or, alternatively, a computer system of a retailer could include information about the benefit.

NFTs can be created, recorded, or "minted" into the blockchain ledger stored in the blockchain network, and thereby stored in memory of one or more of the blockchain nodes. Further, such cryptographic tokens can be destroyed or "burned" by permanent removal from circulation in the blockchain network. Burning can be accomplished in a variety of ways, including by transferring ownership of the cryptographic token to a general, null address that is inaccessible and unowned. Manufacturers, also referred to herein as brands or organizations, may burn cryptographic tokens to create scarcity within the marketplace, or to trigger a condition, or as a result of a condition, or for security purposes. For example, a brand may release, e.g., "drop," a collection of digital assets secured or identified by cryptographic tokens, and then may burn any unsold cryptographic tokens within the collection to preserve exclusivity of those sold. In another example, a brand may drop a collection of digital assets secured or identified by NFTs with the condition that purchasers may only have access to their purchased digital asset when all or a particular quantity of the collection has been purchased, which may be expedited by the brand then burning unsold NFTs to meet the condition prematurely.

There are several ways a user can be enabled to unlock or acquire a cryptographic asset. In one example, upon scanning the physical golf club at a point-of-sale (POS) terminal during first purchase, a unique NFT and corresponding private key are automatically generated and assigned to the user's blockchain wallet. In another example, a private key is provided to the user via a printed or digital receipt, a visual or electronic ID tag (RFID or NFC) hidden in or applied to the physical golf club, a pop-up message or email sent to a personal user account, a push notification or text message sent to a smartphone, or some other record; the consumer uses the private key to link the cryptographic asset to their digital blockchain wallet. Another example may require the user to assemble the private key in part via a physical code or Unique Product Identifier (UPID), e.g., a serial number, associated with the golf club (on the packaging or box, on a hang tag, under a label, embedded within a QR code on the physical golf club or packaging, embedded within a club head or shaft, etc.) and in part via a transaction authentication code (i.e., to prevent a consumer from collecting a cryptographic asset while merely handling golf clubs in a store). As another example, an NFT could be offered for sale directly in an NFT marketplace, directly at a POS system, or on a digital storefront of a retailer or manufacturer.

Another example may require the user to "seek" cryptographic assets in stores, whether physical stores or virtual stores inside a metaverse or game, by using a photographic capture function or augmented reality ("AR") function on a handheld personal computing device. For this method, a private key may be provided via the validated transaction, however, the user must separately find a hidden cryptographic asset in an AR hidden within the store or local area before the digital asset can be transferred to their wallet (i.e., the cryptographic key and the virtual object must both be separately acquired before the transfer occurs).

In a representative example, an authenticated golf club or set is created and assigned a UPID. Upon purchase by a consumer, the UPID may be used to unlock a cryptographic digital asset composed of a collectable digital golf club and associated with a unique non-fungible token (NFT) on a block-chain based distributed computing platform. In general, a consumer must have or procure a blockchain wallet address (e.g., an Ethereum hardware wallet) to purchase, unlock, or acquire an NFT securing a cryptographic digital asset. The blockchain wallet may be used to store a private key belonging to the cryptographic digital asset and may be linked to a personal account that is registered with the original manufacturer of the physical golf club.

In some instances, the cryptographic digital asset may not be originally linked to a physical product, but instead may be gifted (e.g., by gifting or transferring an NFT securing the cryptographic digital asset) or sold as part of a brand promotion campaign, event, moment, or experience. In some instances, the brand may host or commission a raffle, a game, a contest or other virtual promotion campaigns, events, moments, or experiences for which digital assets may be gifted or sold, or for which NFTs may be generated as proof of attendance or as tickets for entry, among other examples.

FIG. 1 illustrates an example system 100 for generating an NFT corresponding to a paired digital and physical golf club in accordance with some embodiments of the disclosed subject matter. In other embodiments of the disclosed invention, however, a system similar to system 100 could be used to generate other types of NFTs, including, for example, account NFTs. As shown in FIG. 1, the system 100 may include one or more computing devices or user devices 110, one or more servers 120, and one or more servers 140. The digital golf club may include a toe, a heel, a topline or a crown, a sole, a shaft, a hosel, a strike face, a medallion, and a weight insert (not shown).

Still referring to FIG. 1, the one or more computing devices 110 can receive data corresponding to one or more digital golf clubs. Additionally, or alternatively, the one or more computing devices 110 can receive input data from a user that correspond to attributes of one or more digital golf clubs. The one or more computing devices 110 can execute at least a portion of the system 100 to generate one or more NFTs corresponding to the one or more digital golf clubs. Additionally, or alternatively, the one or more computing devices 110 can communicate data corresponding to the one or more digital golf clubs to one or more servers 120 and/or one or more servers 140 over one or more communication networks or connections 130.

The one or more servers 120 can execute at least a portion of the system 100. In such embodiments, the one or more servers 120 can receive data corresponding to one or more digital golf clubs. Additionally, or alternatively, the one or more servers 120 can receive input from a user that correspond to attributes of one or more digital golf clubs. The one or more servers 120 can execute at least a portion of the system 100 to generate one or more NFTs corresponding to the one or more digital golf clubs. Further, information about digital assets, such as digital golf clubs, secured by one or more NFTs can be stored on servers 140.

Figure 2:
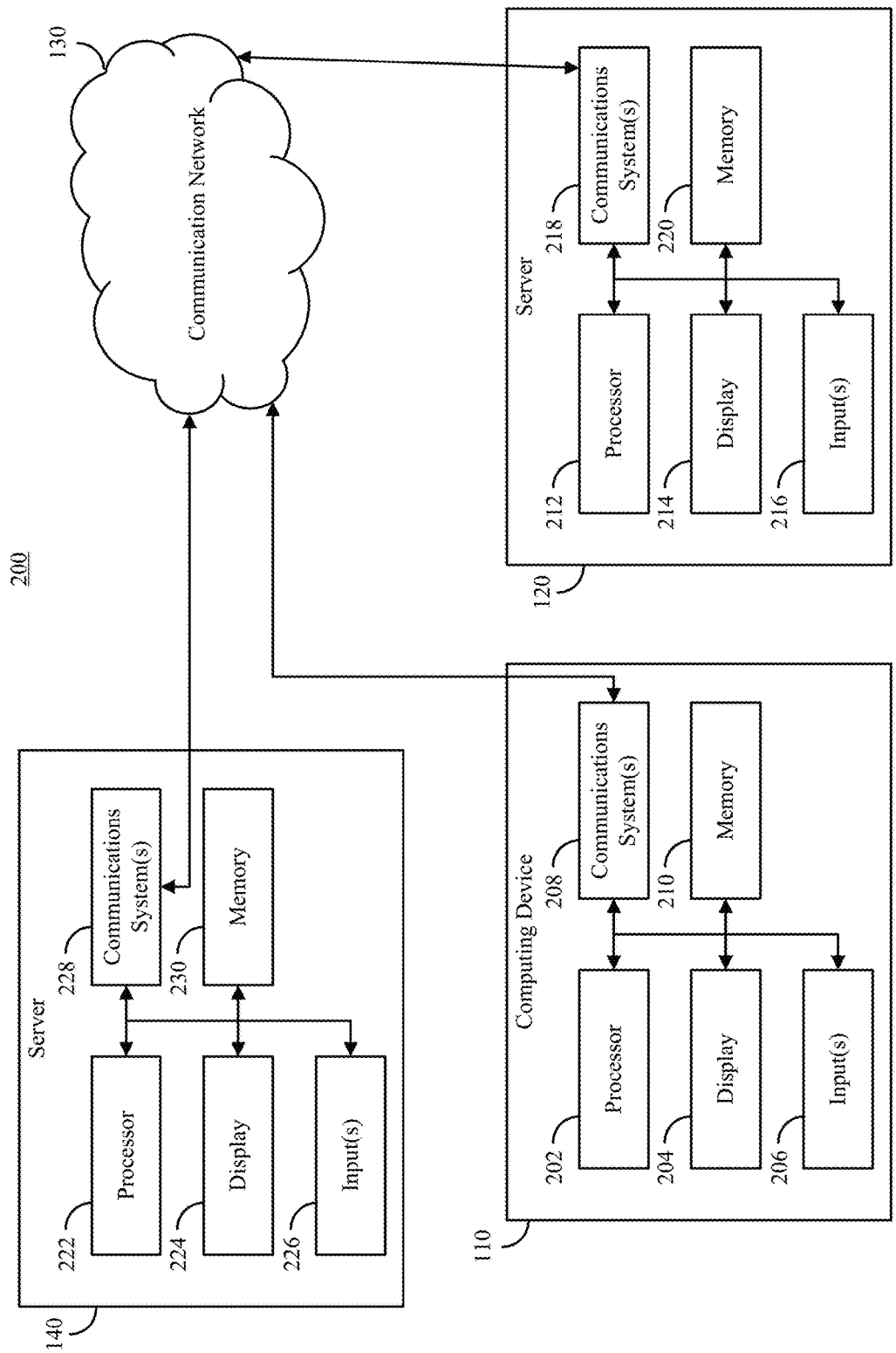
FIG. 2 depicts an example of hardware that can be used to implement a computing device and a server, shown in FIG. 1 in accordance with some embodiments of the disclosed subject matter.

FIG. 2 shows an example of hardware 200 that can be used to implement computing device 110 and/or server 120 in accordance with some embodiments of the disclosed subject matter. As shown in FIG. 2, in some embodiments, computing device 110 can include a processor 202, a display 204, one or more inputs 206, one or more communication systems 208, and/or memory 210. In some embodiments, processor 202 can be any suitable hardware processor or combination of processors, such as a central processing unit (CPU), a graphics processing unit (GPU), an application specific integrated circuit (ASIC), a field-programmable gate array (FPGA), etc. In some embodiments, display 204 can include any suitable display device, such as a computer monitor, a touchscreen, a television, etc. In some embodiments, inputs 206 can include any suitable input devices and/or sensors that can be used to receive user input, such as a keyboard, a mouse, a touchscreen, a microphone, a camera, etc.

In some embodiments, communications systems 208 can include any suitable hardware, firmware, and/or software for communicating information over communication network 130 and/or any other suitable communication networks. For example, communications systems 208 can include one or more transceivers, one or more communication chips and/or chip sets, etc. In a more particular example, communications systems 208 can include hardware, firmware and/or software that can be used to establish a Wi-Fi connection, a Bluetooth connection, a cellular connection, an Ethernet connection, etc.

In some embodiments, memory 210 can include any suitable storage device or devices that can be used to store instructions, values, etc., that can be used, for example, by processor 202 to generate a non-fungible token, to present a digital asset using display 204, to communicate with server 120 via communications system(s) 208, etc. Memory 210 can include any suitable volatile memory, non-volatile memory, storage, or any suitable combination thereof. For example, memory 210 can include random access memory (RAM), read-only memory (ROM), electronically-erasable programmable read-only memory (EEPROM), one or more flash drives, one or more hard disks, one or more solid state drives, one or more optical drives, etc. In some embodiments, memory 210 can have encoded thereon a computer program for controlling operation of computing device 110. For example, in such embodiments, processor 202 can execute at least a portion of the computer program to receive inputs from a graphical user interface for customizing a golf club, store in memory an image of a digital asset based on the user's customizations, generate a non-fungible token based on the digital asset, and mint the non-fungible token to a blockchain network made up of computing devices 110 and/or servers 120. As another example, processor 202 can execute at least a portion of the computer program to implement the system 100 for generating an NFT corresponding to a paired digital and physical golf club. As yet another example, processor 202 can execute at least a portion of process 500, 700, and 800 described below in connection with FIGS. 5, 7 and 8.

In some embodiments, server 120 can include a processor 212, a display 214, one or more inputs 216, one or more communications systems 218, and/or memory 220. In some embodiments, processor 212 can be any suitable hardware processor or combination of processors, such as a CPU, a GPU, an ASIC, an FPGA, etc. In some embodiments, the display 214 can include any suitable display device, such as a computer monitor, a touchscreen, a television, etc. In some embodiments, inputs 216 can include any suitable input devices and/or sensors that can be used to receive user input, such as a keyboard, a mouse, a touchscreen, a microphone, a camera, etc.

In some embodiments, communications systems 218 can include any suitable hardware, firmware, and/or software for communicating information over communication network 130 and/or any other suitable communication networks. For example, communications systems 218 can include one or more transceivers, one or more communication chips and/or chip sets, etc. In a more particular example, communications systems 218 can include hardware, firmware and/or software that can be used to establish a Wi-Fi connection, a Bluetooth connection, a cellular connection, an Ethernet connection, etc.

In some embodiments, memory 220 can include any suitable storage device or devices that can be used to store instructions, values, etc., that can be used, for example, by processor 212 to present content using display 214, to communicate with one or more computing devices 110, etc. Memory 220 can include any suitable volatile memory, non-volatile memory, storage, or any suitable combination thereof. For example, memory 220 can include RAM, ROM, EEPROM, one or more flash drives, one or more hard disks, one or more solid state drives, one or more optical drives, etc. In some embodiments, memory 220 can have encoded thereon a server program for controlling operation of server 120. For example, in such embodiments, processor 212 can execute at least a portion of the server program to receive inputs from a GUI for customizing a golf club or set, store in memory (e.g., memory 220) an image of a digital asset based on the user's customization, generate an NFT based on the digital asset, and/or mint the NFT to a blockchain network made up of computing devices 110 and/or servers 120. As another example, processor 212 can execute at least a portion of the server program, which can be a smart contract, to implement the system 100 for generating an NFT corresponding to a paired digital and physical golf club. As yet another example, processor 202 can execute at least a portion of process 500, 700, and 800 described below in connection with FIGS. 5-9.

In some embodiments, server 140 can include a processor 222, a display 224, one or more inputs 226, one or more communications systems 228, and/or memory 230. In some embodiments, processor 222 can be any suitable hardware processor or combination of processors, such as a CPU, a GPU, an ASIC, an FPGA, etc. In some embodiments, the display 224 can include any suitable display device, such as a computer monitor, a touchscreen, a television, etc. In some embodiments, inputs 226 can include any suitable input devices and/or sensors that can be used to receive user input, such as a keyboard, a mouse, a touchscreen, a microphone, a camera, etc.

In some embodiments, communications systems 228 can include any suitable hardware, firmware, and/or software for communicating information over communication network 130 and/or any other suitable communication networks. For example, communications systems 228 can include one or more transceivers, one or more communication chips and/or chip sets, etc. In a more particular example, communications systems 228 can include hardware, firmware and/or software that can be used to establish a Wi-Fi connection, a Bluetooth connection, a cellular connection, an Ethernet connection, etc.

In some embodiments, memory 230 can include any suitable storage device or devices that can be used to store instructions, values, etc., that can be used, for example, by processor 222 to present content using display 224, to communicate with one or more computing devices 110, etc. Memory 230 can include any suitable volatile memory, non-volatile memory, storage, or any suitable combination thereof. For example, memory 230 can include RAM, ROM, EEPROM, one or more flash drives, one or more hard disks, one or more solid state drives, one or more optical drives, etc. In some embodiments, memory 230 can have encoded thereon a server program for controlling operation of server 140. For example, in such embodiments, processor 222 can execute at least a portion of the server program to receive inputs from a GUI for customizing a golf club or set, store in memory (e.g., memory 230) an image of a digital asset based on the user's customization, generate an NFT based on the digital asset, and/or mint the NFT to a blockchain network made up of computing devices 110 and/or servers 120, 140. As another example, processor 222 can execute at least a portion of the server program to implement the system 100 for generating an NFT corresponding to a paired digital and physical golf club. As yet another example, processor 222 can execute at least a portion of process 500, 700, and 820 described below in connection with FIGS. 5, 7, and 9.

Figure 3:
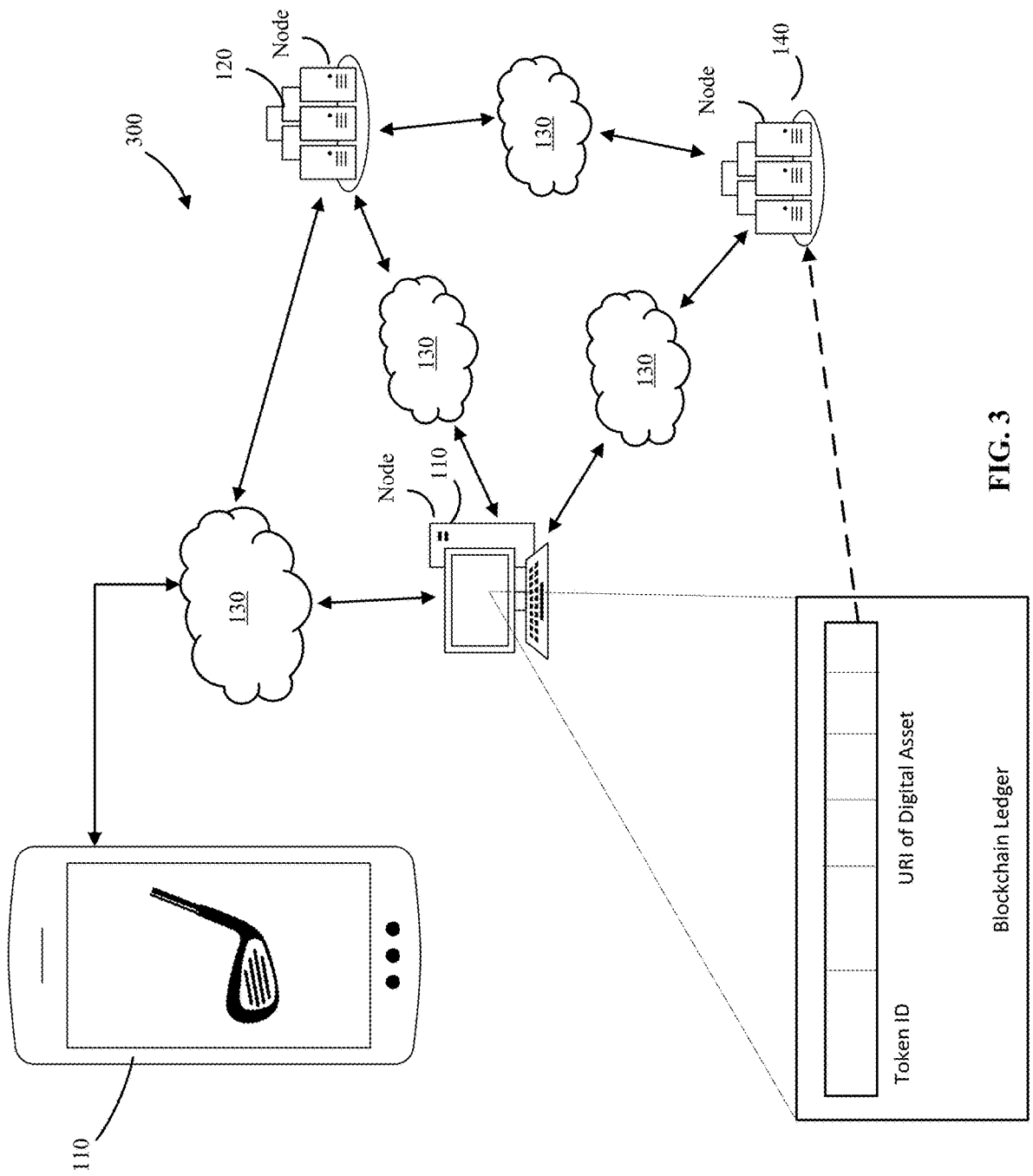
FIG. 3 depicts a schematic representation of an example blockchain network according to some embodiments of the present disclosure.

FIG. 3 illustrates an example blockchain network 300 according to some embodiments of the present disclosure. The blockchain network 300 may include one or more blockchain nodes. The blockchain nodes may each be a computing device 110 (e.g., similar to computing device 110 of FIGS. 1 and 2), or a server 120 (e.g., similar to server 120 of FIGS. 1 and 2) that are in communication with one another (e.g., via a communication network similar to the communication network 130 of FIGS. 1 and 2). The golf club NFT may be stored in a blockchain ledger stored on one or more of the blockchain nodes (e.g., "minted" into the blockchain ledger stored in the blockchain network, and thereby stored in memory of one or more of the blockchain nodes). For example, attributes of the golf club NFT may be stored in memory on a local computing device (e.g., computing device 110), and may be copied into the memory of one or more blockchain nodes, e.g., servers, such as server 120, and/or computing devices that may be similar to computing device 110. The one or more blockchain nodes may be responsible for storing data that is contained in the blockchain ledger. Each of the one or more blockchain nodes may store (e.g., in memory, such as, memory 210 or 220) a copy of the blockchain ledger, e.g., a deed tracking various transactions of, and modifications to, an NFT securing a digital asset, such as a digital golf club.

The information of an NFT stored in the blockchain may be minimal, as there may be a cost associated with storing information on the blockchain. Therefore, metadata of the digital asset, and the digital asset itself can be stored in a memory (e.g., memory 230) or storage of the one or more servers 140. A URI can be stored with the NFT on the nodes 110, 120, and can include an address of the digital asset stored on the one or more servers 140, so that information about the digital asset can be obtained from the URI stored in the NFT, and the users of the blockchain network do not pay a disproportionate price for storing digital assets on the blockchain network.

The one or more blockchain nodes may each be a computing device located at one or more geographic locations, thereby creating a decentralized computing architecture. The blockchain network may be a public network (e.g., available to any user), or a private network (e.g., available to a specific set of users). For example, an organization may develop an application for storing NFTs corresponding to both digital and physical products, e.g., golf clubs, golf club sets, headcovers, golf bags, articles of footwear, or articles of apparel. The application may be a mobile application, or desktop application, or a web-based applet, comprising computer-readable instructions stored in, for example, memory 210 or 220, and configured to be executed by, for example, processor 202 or 212 (see FIG. 2). Any user who downloads the application onto a computing device, may then add their computing device to the blockchain network as a blockchain node. In some embodiments, the blockchain network may be private and, thus, limited to users who download the organization's application and obtain authorization to participate. If the application is available to the public, then the blockchain network may be a public network. However, if the organization restricts who has access to the application, or restricts authorization for select individuals who download the application from becoming a blockchain node, then the blockchain network may be a private network, such as e.g., a permissioned network. Generally speaking, the permissioned network is a distributed ledger that is not publicly accessible and can only be accessed by users with certain permissions, and the users can only perform specific actions granted to them by the central owner or the ledger administrators and are required to identify themselves through certificates or other digital means. In some embodiments, the blockchain network may be a known blockchain network (e.g., Bitcoin, Ethereum, or the like), and the permissioned network may be a sub-set or service associated with a known blockchain network.

The blockchain network may be an open, yet encrypted peer-to-peer network in which asset transaction records are linked via cryptographic hash functions in a distributed, immutable ledger of interconnected blocks. Each blockchain node may contain a ledger of blocks that includes one or more digital asset transactions accompanied by corroboration information representing a validity of each transaction as assessed by peer-validation devices, e.g., the other blockchain nodes in the blockchain network. Encrypted, decentralized computing architectures allow for authentication of transacted assets while preventing duplication of ownership of a cryptography-protected ("cryptographic") digital asset registered to the blockchain network. Decentralized asset management may work by encrypting a proprietary asset file, breaking the encrypted code into segments, and sending the segments to numerous different blockchain nodes (e.g., the blockchain nodes of FIG. 3) in the blockchain network. A validated owner may be provided with a private key that indicates where in the network the digital asset is located and how to reassemble or "decrypt" the file. For use as a distributed ledger, an individual blockchain may be managed by a host administrator and distributed to multiple peers collectively adhering to a protocol for inter-node communication and transaction validation.

The golf club NFT (i.e., the NFT representing ownership of a digital golf club) may be stored in the blockchain network. The golf club NFT may include, or may reference metadata corresponding to a digital golf club (e.g., 2D representation, or a 3D representation of a virtual golf club), and a golf club token ID. The golf club token ID may be a 32-bit, 64-bit, or 128-bit alphanumeric code that is sectioned into individual segments. For example, the alphanumeric code may be sectioned into 2 segments, 4 segments, 8 segments, 16 segments, or 32 segments. The NFT can include a URI specifying a location where metadata of the digital asset can be located. The metadata provided at the web address specified can serve a list or attributes of the digital asset in JSON format that is provided in accordance with contemporary and relevant standards, such as, e.g., an Ethereum Request for Comments (ERC) 721 (Non-Fungible Token Standard) or ERC1155 (Multi Token Standard), among other relevant standards and as appropriate for the particular blockchain network and applications used therewith. This metadata can be stored on the one or more servers 140, which can be controlled by the manufacturer or the retailer.

For example, using the example of a golf club, the metadata provided at the URI address specified in the NFT and hosted on servers 140 can correspond to one or more attributes from the group of: a golf club image, golf club handing (i.e., left hand or right hand orientation), golf club size, golf club type, golf club fit, golf club color, golf club model, location of manufacture, date of manufacture, or date of purchase. Additional combinations of the above-listed attributes should be recognized by those of ordinary skill in the art.

The digital golf club type may comprise metadata corresponding to a putter, iron, fairway or wood, hybrid, or driver. The digital golf club handing may comprise metadata corresponding to left hand or right hand. The golf club size may comprise metadata corresponding to shaft length in U.S. Men's sizes. It should be understood that metadata may correspond to similar sizes in Women's sizes, children's sizes, unisex sizes, and shaft length measurements of foreign countries. The digital golf club model may comprise metadata corresponding to a subset or species of the type of golf club type. For example, the golf club model may comprise metadata corresponding to a 1-wood, 3-wood, 5-wood, 7-wood, and so on. The golf club model may comprise metadata corresponding to a 1-iron, 2-iron, 3-iron, 4-iron, 5-iron, 6-iron, 7-iron, 8-iron, 9-iron, pitching wedge, approach wedge, sand wedge, or a lob wedge. The golf club color segment may comprise metadata corresponding to Black, Gray, Brown, Blue, Green, Orange, Tan, Yellow, Red, White, Multi-Colored, or Pink. The golf club fit segment may comprise metadata corresponding to various fit and performance measurements.

One should appreciate that the disclosed systems and techniques provide many advantageous technical effects including construction and storage of a digital asset blockchain representing user-to-user transactions of virtual collectables. Further, the blockchain technology enables the creation of unique, yet fully transferrable digital assets that maintain value by way of the general inability to make lossless copies, unlike traditional, unsecured digital files.

Figure 4:
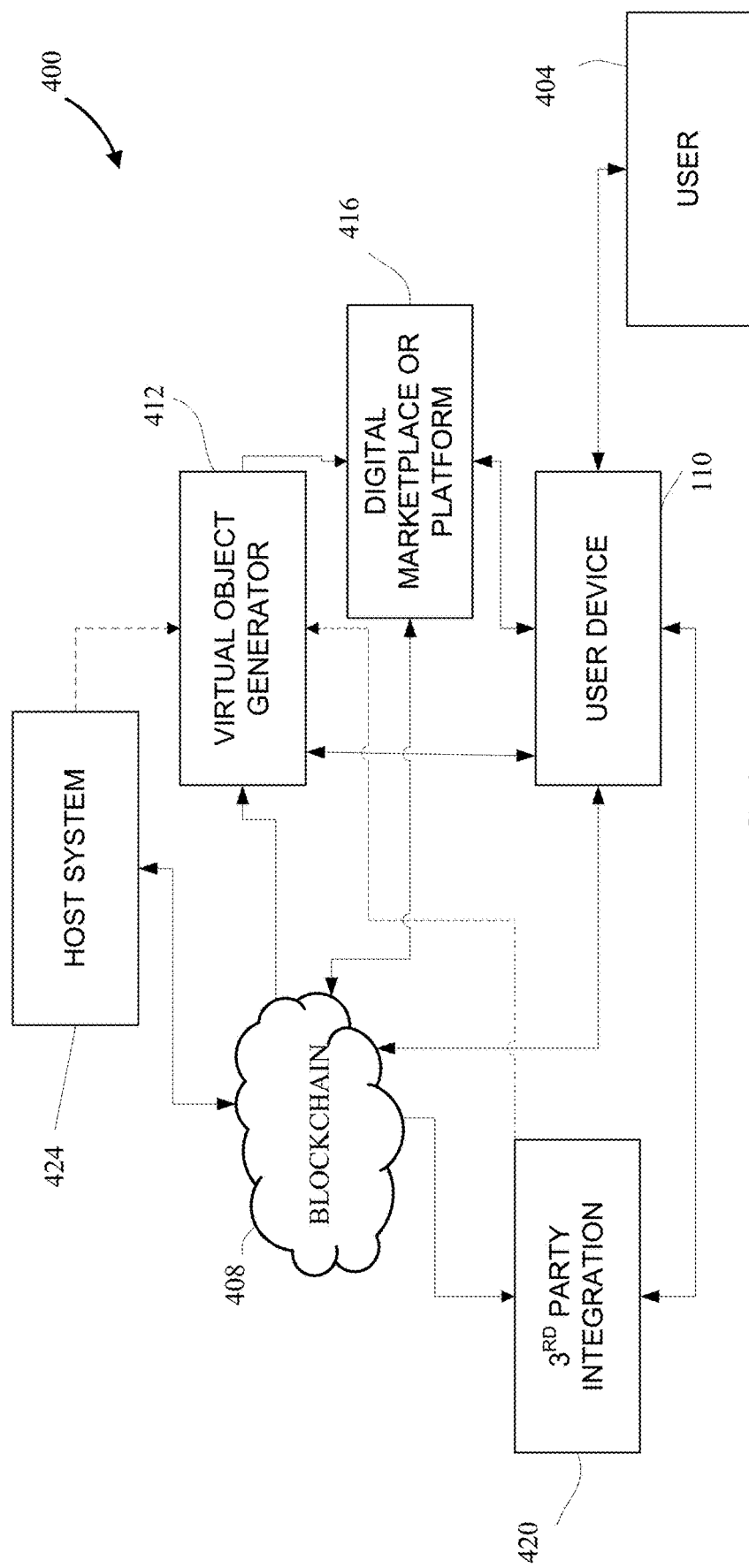
FIG. 4 depicts another schematic representation of an example blockchain network according to some embodiments of the present disclosure.

FIG. 4 provides a schematic representation of a functional structure of a decentralized computing system or blockchain network 400, similar to the blockchain network 300 of FIG. 3. As generally illustrated, a user 404 may operatively interface with the user device 110 that may include one or more of a smartphone, a tablet computer, a smart watch, a laptop computer, a desktop computer, a standalone video game console, smart footwear/apparel, or other similar internet enabled devices, e.g., a television, an exercise machine or device, or a vehicle, among other examples. The user device 110 may be operatively configured to communicate with one or more of an immutable public database (e.g., a blockchain service/network 408—referred to as "blockchain network 408"), a virtual object generator 412, an online digital marketplace or platform 416, and/or a third ($3^{rd}$) party integration service 420.

In general, the blockchain network 408 may include at least one NFT registered thereon that includes or references information representative of a digital asset. The user 404, via the user device 110, may be in possession of or may have a wallet that includes a private cryptographic key that permits the user device to read the encrypted data associated with the NFT. This key may further enable the user 404 to freely transfer ownership of the NFT.

A virtual object generator 412 may be provided to create a digital object or a digital asset on the basis of the information associated with the token. The virtual object generator 412 may employ a plurality of style and artistic rules such that images associated with the resultant digital objects are unique, yet recognizable according to predefined silhouettes, styles, articles, or characters. In some embodiments, the virtual object generator 412 may create the virtual object on the basis of auxiliary factors, such as the age of the asset, user activity (tracked via the user device), or use via third party platform. The virtual object generator 412 and/or blockchain network 408 may further be in communication with a hosted digital marketplace 416, forum, social platform, or the like. The digital marketplace may represent a plurality of virtual objects in a manner that permits the organized trade and/or sale/purchase of the virtual objects between parties. Upon closing of the sale or transfer, the digital marketplace 416 may update the blockchain network 408 with the new ownership information and facilitate the transfer of new or existing keys to the new asset holder. In some embodiments, the marketplace 416 may further enable various social engagement functions, such as voting or commenting on the represented virtual objects. Likewise, in some instances the marketplace 416 may be configured to assess and score the scarcity of a particular virtual object based on the sum total of the object's expressed features or characteristics, as well as consideration of any of the auxiliary factors. Such a scarcity score may then enable the marketplace (and/or users who participate within the marketplace) to better assess the value of the object.

Further, the system 400 may further include a 3rd party integration service 420 that may enable the use of the virtual object in different contexts or manners. The 3rd party integration service 420 may operate as an API on an app provided on the user's device, or as a dedicated cloud based service. In some embodiments, the 3rd party integration service 420 may make the virtual object (e.g., as expressed by the virtual object generator 412), and/or the information available for external use. Examples of such a use may include skins on 3rd party video game characters, objects capable of being used by 3rd party video game characters, digital artwork displays, physical 2D print generation, manufacturing production, such as, e.g., 3D print generation, and the like. In one embodiment, the information and/or scarcity score may be made available and may alter the characteristics or abilities of a user's video game character in a video game played on the user's device 110.

A corporate host system 424 may be in communication with the blockchain network 408 for the purpose of provisioning and/or initially creating new digital assets, and storing or updating metadata associated with the assets. Additionally, the host system 424 may provide one or more rules to the virtual object generator 412 to constrain the manner and style in which genomic information from the blockchain network 408 is expressed in a visual/artistic form.

Figure 5:
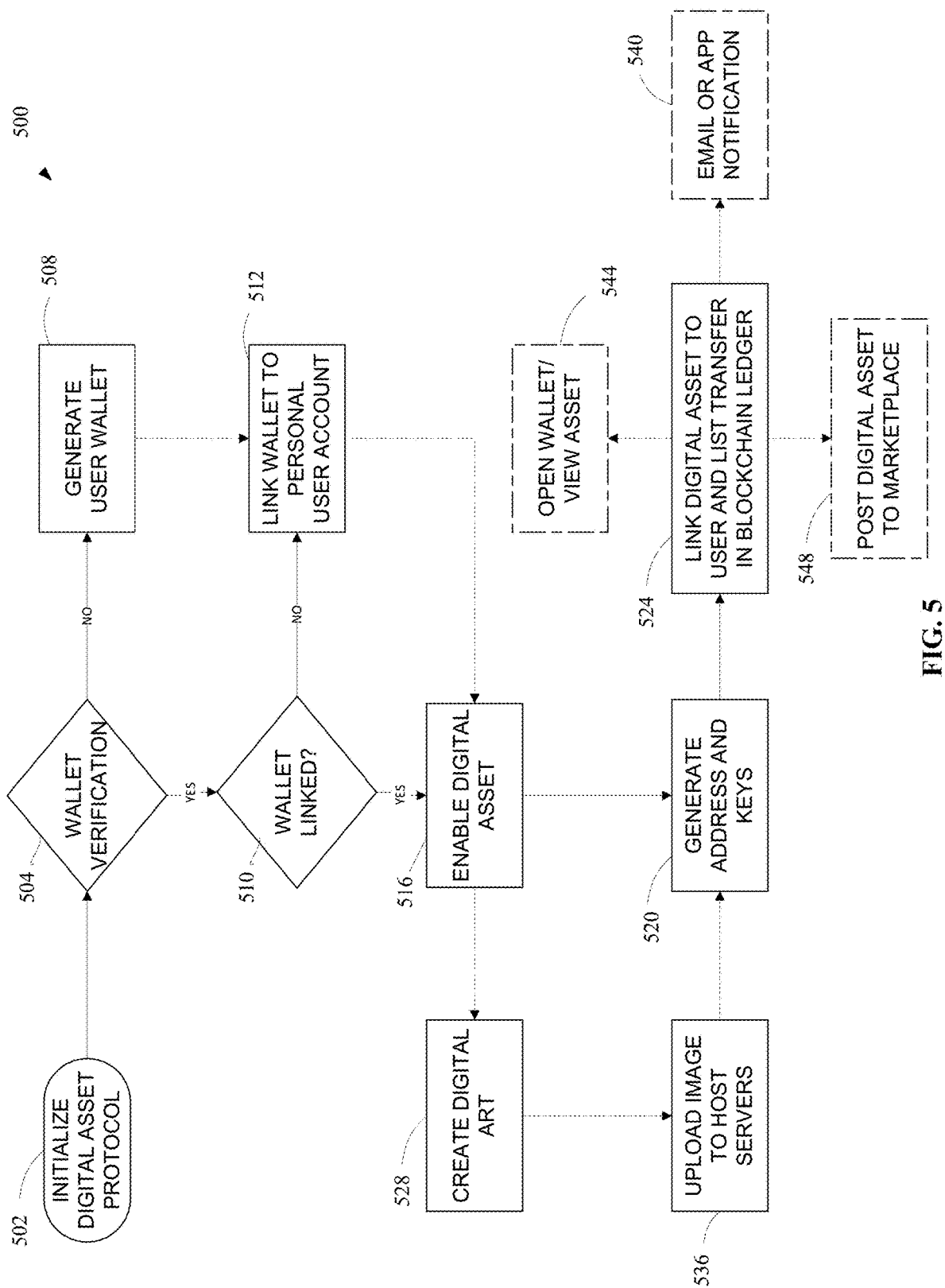
FIG. 5 depicts a flowchart for an example method of generating a digital asset protected by a non-fungible token according to some embodiments of the present disclosure.

With reference to FIG. 5, a method of generating a digital asset protected by NFTs on a blockchain ledger is generally described in accordance with aspects of the present disclosure. Some or all of the operations in FIG. 5 and described in further detail below may be representative of an algorithm that corresponds to processor-executable instructions that may be stored, for example, in main or auxiliary remote memory, and executed, for example, by a resident or remote controller, central processing unit (CPU), control logic circuit, or other module or device or network of devices, to perform any or all of the above or below described functions associated with the disclosed concepts. It should be recognized that the order of execution of the illustrated operation block may be changed, additional blocks may be added, and some of the blocks described may be modified, combined, or eliminated.

The method 500 of FIG. 5 starts at terminal block 502 with processor-executable instructions for a programmable controller or control module or similarly suitable processor to call up an initialization procedure for a protocol to generate a cryptographic digital asset, such as a computer-generated digital golf club and encrypted token key, for a consumer product. This routine may be called-up and executed in real-time, continuously, systematically, sporadically, and/or at regular intervals. As a representative implementation of the methodology set forth in FIG. 5, the initialization procedure at block 502 may automatically commence each time an authentic golf club is manufactured, at various stages of the supply chain and manufacturing process, each time a user 404 purchases a real-world golf club, or each time the user 404 unlocks an access key. Alternatively, the initialization procedure may be manually activated by an employee at a POS terminal or by the manufacturer. Further, a given number of digital assets may be generated before a golf club is produced, and redemption of the NFT associated with the digital asset can entitle the owner to production of the represented club.

Other initialization procedures may be initiated for different digital assets, which may represent assets other than golf clubs. For example, a digital asset could represent a proof of attendance at a given event. Accordingly, the digital asset could be instantiated upon a confirmation of attendance at an event. Alternatively, a limited number of proof of attendance NFTs may be minted for an event, and those NFTs may be earned by attendees on a first-come first-serve basis, or attendees could earn the remaining NFTs by scanning a QR code, for example. Digital assets can correspond to utility NFTs, which can provide a functionality to the owner. For example, a digital asset can entitle the owner to access to benefits or exclusive content, e.g., as discussed further below and with respect to FIG. 6.

Using a user device 110, such as, e.g., a portable electronic device, including a smartphone, or other electronic device, the user 404 may launch a dedicated mobile software application (app) or web-based applet that collaborates with a server-class (backend or middleware) computer (e.g., a remote host system) to communicate with the various peer devices on the decentralized computing system 400. During a communication session with, e.g., the host system 424, the user 404 may purchase a golf club using a corresponding feature provisioned by the app. The user 404 enters the personal information and a method of payment to complete the transaction. Upon completion of a validated payment, the host system 424 receives, e.g., from an online store transaction module or an approved third-party electronic payment system, a transaction confirmation to indicate a validated transfer of the golf club to the user 404 has been completed. As indicated above, validated transfer of the golf club may be effectuated through any available means, including at a brick-and-mortar store, through an online auction website, an aftermarket consumer-to-consumer trade/sale, etc. In other embodiments, the user 404 may perform other transactions, or purchase other products. For example, the user 404 may purchase a digital asset represented by an NFT directly or may purchase a product other than a golf club, which may have a digital asset associated therewith (e.g., a golf bag). A user 404 may receive an NFT representing ownership of a digital asset without performing a transaction, for example, by earning the NFT through attendance at an event.

Next, the method 500 proceeds to decision block 504 to determine if the user 404 has procured a cryptocurrency wallet or other similarly suitable digital blockchain account that is operable, for example, to upload and maintain location and retrieval information for digital assets that are encrypted and stored in a decentralized manner. A cryptocurrency wallet typically stores public and private key pairs, but does not store the cryptocurrency itself; the cryptocurrency is decentrally stored and maintained in a publicly available blockchain ledger. With the stored keys, the owner may digitally sign a transaction and write it to the blockchain ledger. A platform-dictated smart contract associated with the wallet may facilitate transfer of stored assets and create a verifiable audit trail of the same. If the user 404 has not already acquired a digital blockchain wallet, the method 500 continues to predefined process block 508 to set up a wallet. By way of non-limiting example, user 404 may be prompted to visit or may be automatically routed to any of an assortment of publicly available websites that offer a hardware wallet for cold storage of cryptocurrency such as an ERC20-compatible Ethereum wallet provided by MyEtherWallet, or Metamask, among other viable sources or providers.

Once the system confirms that the user 404 has a suitable digital blockchain wallet at process block 504, the method 500 may check if the wallet is linked to a personal user account at decision block 510. In some instances, the user 404 may have already linked a wallet to a user account in a prior transaction, and thus, the method 500 could proceed to process block 516. Where the user 404 has not linked their wallet, the method 500 may automatically link, or prompt the user 404 to link, the digital blockchain wallet to a personal user account, as portrayed at process block 512 of FIG. 5. This linking at process block 512 may proceed automatically if a wallet was generated at process block 508, without the need to perform a check at decision block 510 of whether the wallet has been linked. Linking a wallet to a personal account at process block 512 may require the remote host system 424 retrieve a unique owner ID code associated with the purchasing party (e.g., user 404) from an encrypted relational database, e.g., provisioned through cloud computing system 130. At this time, a unique physical golf club ID code associated with the purchased golf club may be linked to the user's personal account.

Upon determining that the user 404 has acquired a digital blockchain wallet, i.e., block 504=YES, and that the wallet is linked to a personal user account, i.e., block 510=YES, or after linking the user's blockchain wallet to their personal user account at block 512, the method 500 continues to input/output block 516 to enable a cryptographic digital asset associated with the golf club. As indicated above, after purchasing the golf club, the universally recognized UPID product code may be used to retrieve a collectable golf club NFT which is identified by an encrypted token key, and is generally associated with a collectable digital golf club. In some embodiments, the UPID may be used to trigger a function of the golf club NFT, such as compensation for a third party, e.g., a fitter, associated with or identified by the metadata of the golf club NFT. A third-party or a retailer at a POS terminal or the user 404 employing their user device 110 may scan the UPID or UPC on the golf club or a box storing therein the golf club. Accordingly, enabling a cryptographic digital asset, at block 516, may be automatic, random, systematic, prize based, or any logically appropriate manner.

After receiving confirmation that a cryptographic digital asset has been authorized at input/output block 516, the method 500 generates a cryptographic digital asset for the transacted golf club. This may comprise generating a unique, encrypted asset code with a contract address (i.e., the address where the smart contract is deployed on the blockchain network), a token, and a public and private key pair, as denoted at predefined process block 520. Host system 424 may transmit the token, with the public key and the owner ID, to a distributed blockchain ledger to record and peer-validate transfer of the cryptographic digital asset to the user 404 on a transaction block. Host system 424 can also store the metadata of the digital asset, and/or the digital asset itself, which can be accessed via the address provided in the NFT. The method 500 continues to process block 524 to link the cryptographic digital asset with the unique owner ID code. This control logic may comprise executable instructions for assigning the encrypted asset code to the user 404 and storing the public and private keys in the user's digital blockchain wallet.

As shown in FIG. 5, once the digital asset has been linked to a user, as through transfer to the user of the NFT securing the digital asset, optional process block 540 may issue a digital notification, such as an email or push notification, to the user's smartphone 110, or other electronic device, with all related information for accessing, transferring, and intermingling the cryptographic digital asset. Additionally or alternatively, the remote host system 424 may operate as a web server hosting a web-based graphical user interface (GUI) that is operable to translate the data stored in the encryption keys into a visual image that is displayed to the user 404 at optional process block 544. Digital asset manipulation and use may also be effectuated through the user's digital blockchain wallet. This may comprise posting the cryptographic digital asset to an online crypto-collectable marketplace or platform, as provided in optional process block 548.

With continuing reference to FIG. 5, in some embodiments, after a digital asset is enabled or initialized at block 516, the method 500 can proceed to process block 528 to produce a virtual representation or "digital art" of the cryptographic digital asset. The virtual representation may include a computer-generated avatar of the golf club or a limited-edition artist rendition of the golf club. It is also envisioned that one or more attributes of the virtual representation of the cryptographic digital asset may be created, in whole or in part, via the user 404. Alternatively, a machine learning function may be executed to generate image features through a neural network to produce the digital art at process block 528. Upon completion of the digital art, the image may be uploaded to host servers 140 at block 536, and the digital art can be included as part of the digital asset.

Generally, by providing and linking metadata to the non-fungible token (NFT) that corresponds to attributes of a physical golf club, the digital golf club corresponding to the NFT will be linked to the physical golf club. For example, the digital golf club may appear to be the same size, color, and material on a display screen (e.g., display screen of computing device 110) as a corresponding physical golf club. In some embodiments, the metadata includes reference to a UPID that corresponds to the physical code, or a version thereof, associated with the physical golf club, thereby linking the golf club NFT to the physical golf club in a one-to-one fashion. In some embodiments, the golf club NFT may be provided as a collection or family of golf club NFTs having, e.g., variations or permutations in attributes or appearance or underlying metadata, but with each golf club NFT in the collection being linked to the same physical golf club model by way of reference to the UPID in the metadata. In this way, multiple golf club NFTs can be generated for a single model or edition of a physical golf club, and each golf club NFT can further represent a unique digital golf club. The golf club NFTs can, therefore, be a collection of two (2) or more, such as, e.g., a collection of 3, 4, 5, 6, 7, 8, 9, 10, 11, 12, or more, a collection of 20 or more, a collection of 50 or more, a collection of 100 or more, a collection of 250 or more, or a collection of 500 or more.

Figure 6:
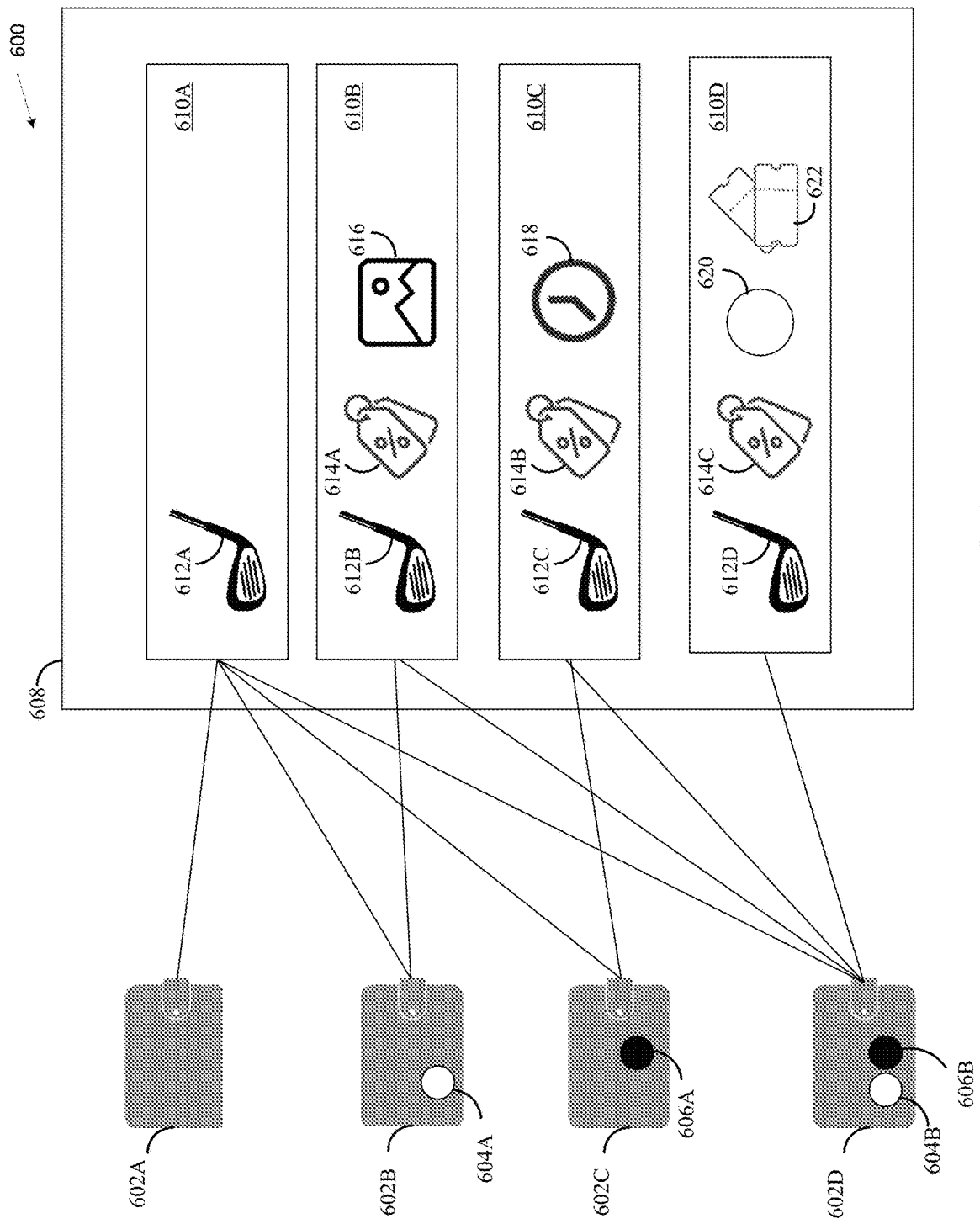
FIG. 6 depicts a schematic representation of an embodiment of a system for providing benefits to a user based on NFT ownership.

In some embodiments, an NFT or multiple NFTs can entitle the owner to exclusive benefits, or access to hosted resources that would otherwise not be available to the owner. In this regard, FIG. 6 illustrates an exemplary system 600 for providing exclusive benefits to NFT owners. Wallets 602A, 602B, 602C, 602D are examples of user wallets that confer a benefit to the owner within the system 600 based on the NFTs in the wallet. It will be appreciated that wallets 602A, 602B, 602C, and 602D may be referred to herein as first, second, third, and fourth wallets, respectively. Wallet 602B for example contains an NFT 604A which is a first type of NFT. For example, the NFT 604A may be a utility NFT, representing an account or activity of the owner. Alternatively, the NFT 604A can be a proof of attendance NFT, or could be an NFT representing ownership of a physical or virtual product such as a physical or virtual golf club. As shown, NFT 604B in wallet 602D is an NFT representing ownership of a digital asset of the same type as the digital asset corresponding to NFT 604A. Correspondingly, NFTs 606A and 606B may signify ownership of a digital asset that is of a different type than the digital assets represented by NFTs 604A and 604B. Digital system 608 may selectively provide a benefit to users owning a cryptocurrency wallet, based on digital properties, the contents of the wallet, and the presence of specific NFTs. As illustrated, digital system 608 is a web site with a user interface, but a digital system according to some embodiments could additionally or alternatively be an API, a video game, or a metaverse, for example.

As shown, the digital system includes four partitions 610A, 610B, 610C, and 610D, which provide a user access to different benefits. A digital system could have additional partitions or fewer partitions, or may dynamically generate a partition based on the NFTs in a user's wallet, and digital properties of those NFTs, such that an access level to a digital system is unique to a given wallet. In the illustrated example, partition 610A is a public partition which is available to any user of the digital system 608. Partition 610A may include a product 612A or a list of products that are publicly available to anyone accessing the digital system 608, regardless of whether they own an NFT, or indeed, whether they have a wallet. While wallet 602A is shown with access to partition 610A, users without a wallet could also access and purchase the product 612A.

Conversely, access to partition 610B can require that a user's wallet contain an NFT 604. For example, as shown, wallet 602B, containing NFT 604A, and wallet 602D containing NFT 604B each entitle the owner to access partition 610B. As shown, access to 610B can provide a user with a benefit or a plurality of benefits. For example, a user owning the wallet 602B may have access to additional products 612B not available to the owners of wallets 602A, 602C or to the general public. These products could include limited edition products, such as limited-edition golf clubs for example. Where the NFT 604A provides ownership of a proof of attendance digital asset, products related to the event, or including themes from the event may be available to the owners of NFTs 604. A further benefit that may be provided through access to partition 610B can be discounts 614A on products or services. Additionally, access to partition 610B may entitle the user to cosmetic customizations, such as custom artwork 616. This custom artwork 616 can, for example, be artwork of or for a shaft of a golf club. The owners of wallets 602B and 602D may thus have the ability to purchase clubs with custom artwork 616 that are not available to users of the system 608 that do not own an NFT 604.

Similarly, ownership of an NFT of type 606 can provide access to partition 610C of the digital system 608, which can include benefits that are different than those provided in partition 610B. Thus, in addition to the publicly available products 612A, an owner of a NFT 606 can have access to exclusive products 612C and discounts 614B not available to users without NFT 606 in their wallets. As illustrated, the products 612C available to owners of type 606 NFTs can be different than the products 612B available to owners of a type 604 NFT. In addition to the above-mentioned benefits (e.g., exclusive products, discounts, and custom artwork), access to a partition can entitle a user to early access 618 to products.

Still referring to FIG. 6, in some embodiments, a user owning multiple types of NFTs may be entitled to access the partitions and the benefits in a digital system associated with each type of NFT owned. For example, as illustrated in FIG. 6, the owner of wallet 602D can access the benefits of partition 610B because the wallet 602D contains NFT 604B, and can further access the benefits in partition 610C because the wallet 602D contains NFT 606B. In some embodiments, ownership of multiple NFTs or specific combinations of NFTs can provide a user with access to additional partitions of a digital system containing additional benefits not available to owners of the individual NFTs. For example, as illustrated in FIG. 6, in addition to having access to partitions 610A, 610B, and 610C, the owner of wallet 602D has further access to partition 610D. This access can entitle the owner of wallet 602D to additional benefits, which could include any of the benefits described above with respect to 610B and 610C, including access to exclusive products 612D and exclusive discounts 614C. Additional benefits can be provided through access to partition 610D, such as, for example, the ability to purchase additional NFTs 620 or tickets 622 to events, such as a golf tournament. As noted, a digital system can have any number of partitions, and different partitions can include any type of benefit. The example benefits described are not intended to be limiting, and benefits can additionally or alternatively include other products, services, discounts, entitlements, or experiences.

An NFT granting a user access to a partition of a digital system can be persistent, or a user may be required to surrender the NFT in exchange for receiving a benefit. In this way, one-time access may be provided to a partition of a system. For example, in the illustrated embodiment of FIG. 6, NFTs 604 may provide access to partition 610B without requiring the user to surrender or burn the NFT 604 when a benefit is obtained. Thus, the owners of wallets 602B and 602D could access the benefits of partition 610B as many times as desired, so long as the NFTs 604A and 604B are in the respective wallets. The owners of wallets 602B and 602D could purchase or otherwise use any of the available benefits (e.g., 612B, 614A, 616) without negatively impacting their ability to access partition 610B. It may be advantageous in other cases to limit access to a partition to minimize a loss associated with provision of a given benefit. As an example, the NFT 606 may have been provided to a user free of charge for performing an action, such as attendance at an event. Thus, the value of the benefits to which the NFT 606 may provide access could exceed a revenue generated by the NFT, and therefore, the digital system may require exchange of the NFT 606 for the benefit provided. As an example, with continued reference to FIG. 6, the owner of wallet 602C could access partition 610C because the wallet contains NFT 606A. However, once the owner of wallet 602C has claimed benefit 614B by purchasing a product at the given discount, the owner can be required to surrender NFT 606A in exchange for the discount 614B. Without NFT 606A, the owner of 602C would no longer have access to partition 610C.

Further, while the digital system 608 illustrated is a web site with a user interface, other digital systems may provide different benefits for ownership of NFTs. As a non-limiting example, an NFT could entitle an owner to access parts of a game or a space within a metaverse. The NFTs 604, 606 could entitle the owners to membership at a virtual country club, or could provide one-time access to play a round of virtual golf, or could provide discounts for in-game products such as skins for a user or a user's golf club. The NFT 604, 606 could be associated with a virtual persona, and actions of the virtual persona could further entitle the owner of the NFT 604, 606 to access benefits, as described above.

Figure 7:
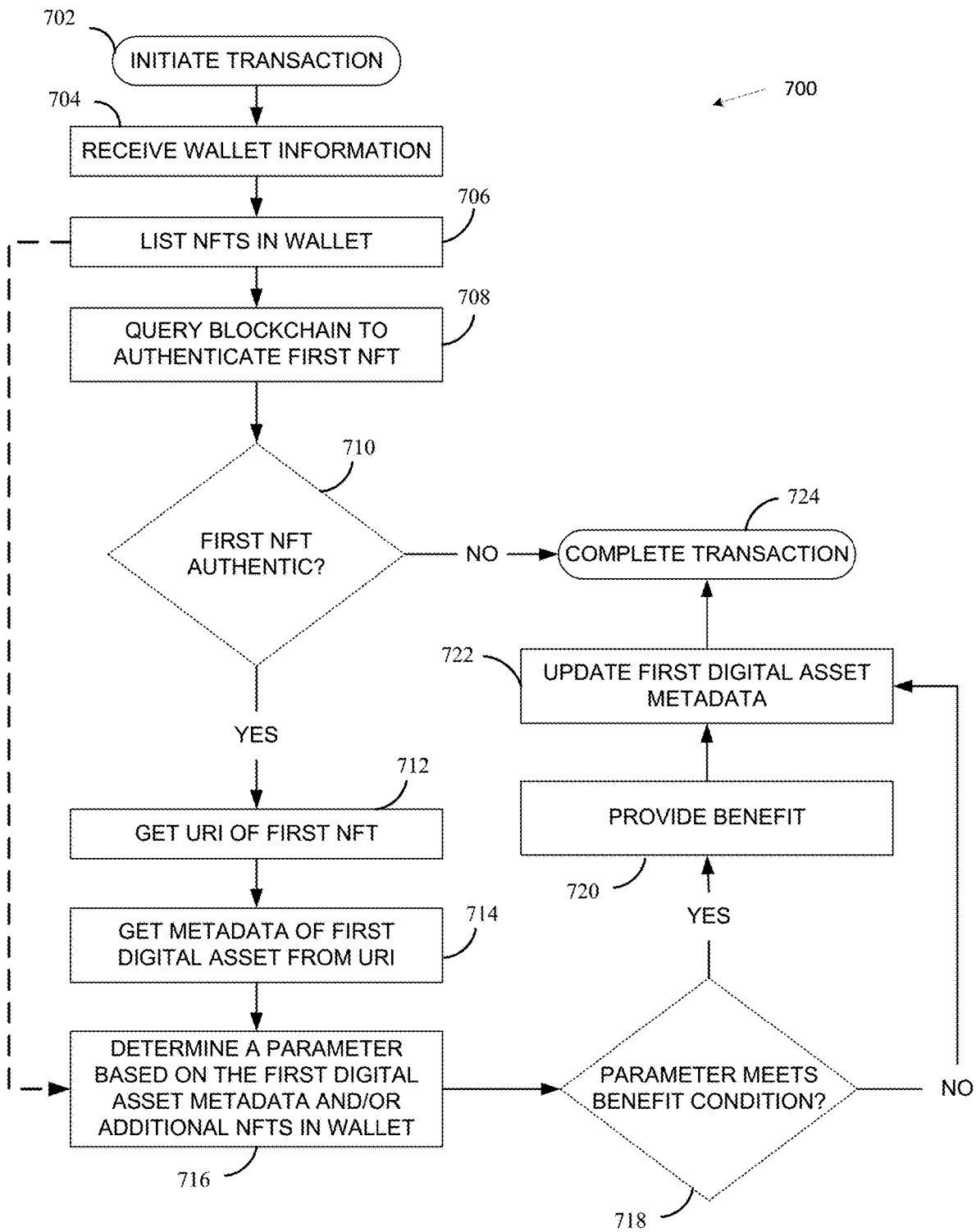
FIG. 7 depicts a flowchart for an example process for providing a benefit to an owner of an NFT.

FIG. 7 illustrates an exemplary process 700 by which an owner of an NFT (e.g., NFTs 604, 606) could earn or accrue benefits from their ownership of the NFT. At step 702, a transaction can be initiated to begin the process 700. A transaction can be any activity that would trigger an update of a digital asset associated with an NFT. For example, a transaction could be a purchase of product (e.g., a golf club, a hat, gloves, etc.), attendance at an event, sale or purchase of an NFT, access to a digital system or website 608, or performing a qualifying action within a video game application or metaverse. Once the transaction is initiated, at step 704, the process 700 can receive information about the wallet of the user who initiated the transaction. Proof of ownership of the wallet may be verified in a cryptographic transaction, which can entitle the user to receive benefits associated with NFTs in the wallet. At step 706, the NFTs within the wallet can be listed, and information about the NFTs can be queried to be used in determining a user's entitlement to earn or receive a benefit. At step 708, process 700 could query the blockchain to authenticate properties of a first NFT. The system can identify the first NFT based on a digital property of the first NFT. For example, the first NFT could be identified as an account NFT, as described above, and could be used to identify a digital asset to be updated in the transaction. Alternatively, a user could identify the first NFT to the system, and present it as the NFT associated with the digital asset to be updated. Authenticating the first NFT can include confirming an originator or creator/minter of the NFT. For example, a manufacturer or retailer may want to confirm that the NFT was not minted by another entity, or is not a counterfeit, and that benefits provided by the manufacturer are not fraudulently obtained by a user. At step 710, if the NFT is found not to be authentic, the transaction can be completed, and no digital asset is updated or benefit provided. If the NFT is authentic, the process 700 can proceed to step 712, where the system queries information of the NFT to get a uniform resource identifier (URI) of the NFT. The URI can be a link to a computer-hosted resource, which can provide further information on the digital asset, or the digital asset itself.

Still referring to FIG. 7, at step 714 the system can access the URI to obtain metadata and information about the first digital asset. Where the NFT is an account NFT, this information could include a listing of purchases or transactions performed by the user, an age of the NFT, benefits associated with the NFT, use of the digital asset secured by the NFT in a video game application or in the metaverse, attendance at events, cumulative totals of purchases or the value of purchases, etc. At 716, this information can be used to calculate or determine a parameter. For example, step 716 could determine how many transactions have been performed in a given amount of time, or could determine a level of activity in a video game application or metaverse, or could determine a total amount of money spent associated with the NFT. Additionally or alternatively, as shown, information from other NFTs in the user's wallet could be used to determine the parameter, including information gathered at step 706. For example, a user's wallet could contain NFTs associated with physical or virtual golf clubs, and the parameter determined could be a number of golf club NFTs in the user's wallet, as determined, for example, at step 706.

With continued reference to FIG. 7, at step 718 the parameter can be compared to a benefit condition to determine if the user is entitled to earn a benefit. The benefit condition could be a total amount spent, or an amount spent in a given time period, or an age of the first NFT, or a number of transactions, or a performance level in a physical or virtual golf tournament. Additionally, the benefit condition could be a predefined number of NFTs in a user's wallet. For example, the benefit condition could require that a user's wallet contain fourteen golf club NFTs before providing a benefit. If the parameter meets the benefit condition, at step 720 a benefit can be provided to the user. As a non-limiting example, the benefit could be any of the benefits 612, 614, 616, 618, 620, or 622 described with respect to FIG. 6. At step 722, the process could update the metadata for the first digital asset. This update could include adding the transaction to the first digital asset, or could include adding information about the benefit to the metadata. For example, the NFT could be updated with information that a benefit has been earned to prevent a duplicate addition of the benefit. If, at step 718, the parameter does not meet the benefit condition, the first digital asset could be updated with information about the transaction. At step 724, the transaction can be completed. A system performing the process 700 could update the metadata of the first digital asset, for example, by adding an entry to a database which can update the information displayed at the URI of the NFT.

NFTs can be "bred" to produce child NFTs that are associated with digital asset that may have properties that make the child NFT valuable. The digital asset secured by the child NFT could include some attributes from the digital assets secured by parent NFTs, or could introduce a difference or a mutation, in accordance with the instructions of a breeding algorithm. Breeding can produce a royalty to the minter of the NFT, and secondary sales of the bred NFT can further produce royalties to the minter, which can be a manufacturer or retailer in some instances. In some embodiments, the properties of two digital assets secured by NFTs may not be combinable, as when the NFTs are of a different type. Breeding a utility or account NFT with a golf club NFT, for example, would not produce a child golf club NFT associated with a digital asset having properties of both parents. In these cases, a breeding algorithm could produce a "mutant" child NFT, which can be of a different type than either of the parent NFTs. For example, breeding a golf club NFT with a utility NFT could produce an NFT entitling the owner to a discount, or to access to special products, or to one-time access to a partition of a digital resource, as illustrated in FIG. 6. In some embodiments, restrictions can be imposed on breeding. For example, the smart contracts defining breeding may limit a number of children an NFT can sire, and/or can impose a waiting time between consecutive breedings of an NFT, or could limit an age beyond which an NFT would be incapable of breeding. Further, in some embodiments, more than two parents can breed to produce a single child. For example, three parent golf club NFTs could breed to produce a single child NFT associated with a digital asset having a combination of the properties of each of the digital assets secured by the parent NFTs.

Figure 8:
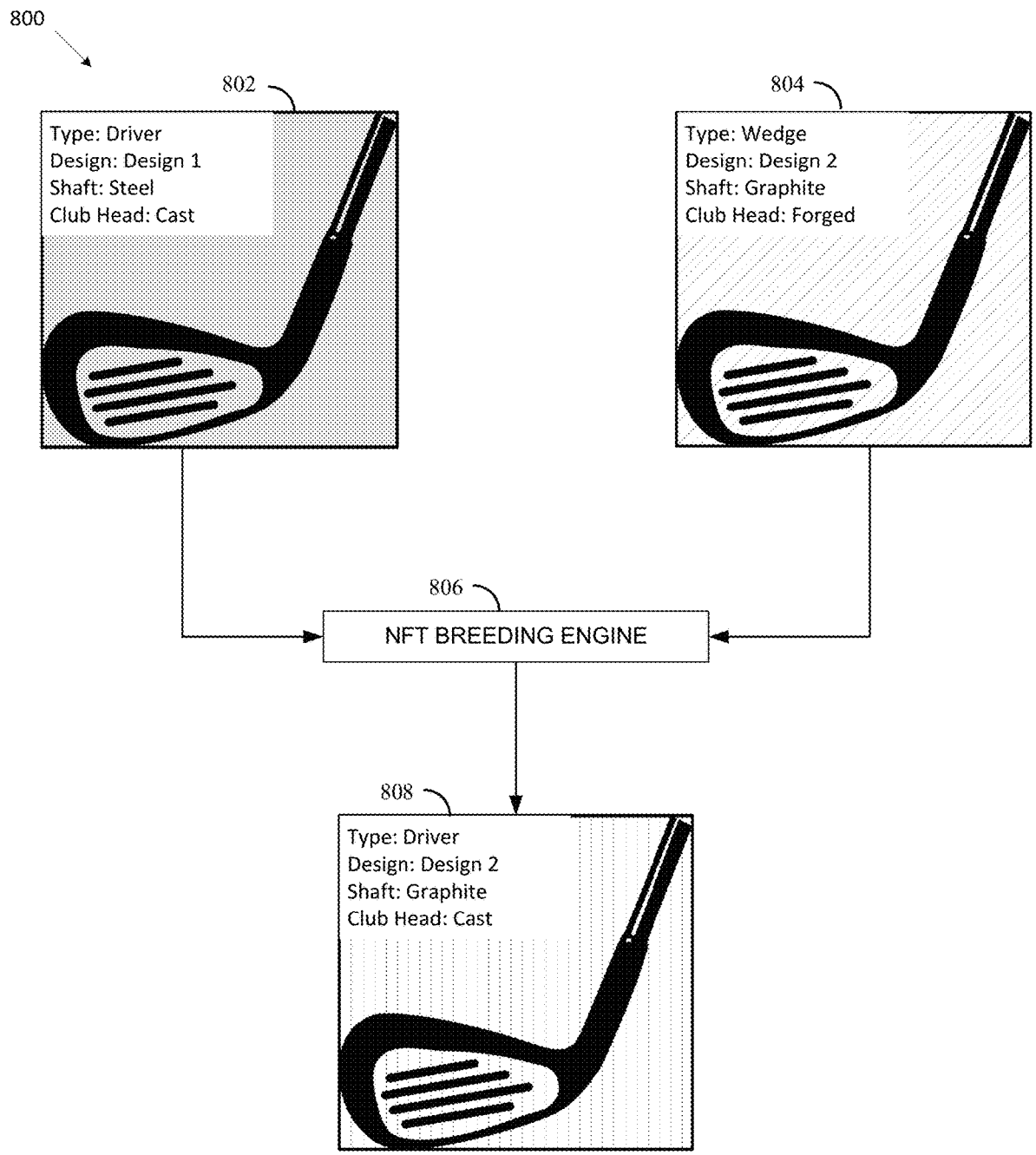
FIG. 8 depicts a schematic representation of a breeding process for breeding two golf club NFTs, according to some embodiments.

FIG. 8, for example, illustrates an exemplary breeding process 800 for two NFTs. In the illustrated embodiment, two parent golf club NFTs 802, 804 are illustrated, however, in other embodiments, a breeding process could include more than two parent NFTs. The golf club NFTs 802, 804 could be associated with a physical golf club, a virtual golf club, or both, or could alternatively be associated with a digital asset representing the right to obtain a custom golf club whether at a discount or not. Further, in some embodiments, either of the parent golf club NFTs 802, 804 could themselves be products of a breeding process, and thus could be child NFTs of other parent NFTs. As illustrated, each parent golf club NFT 802, 804 could be associated with a set of properties of a golf club, and breeding the golf clubs NFTs 802, 804 could thus produce golf club NFTs associated with digital golf clubs having desired properties. For example, the digital asset secured by golf club NFT 802 is a driver, having a cosmetic design (e.g., a shaft design) shown as "Design 1," a steel shaft, and a club head that is manufactured through casting. The digital asset secured by golf club NFT 804 is a wedge having a cosmetic design shown as "Design 2," a graphite shaft, and a forged club head. In some embodiments, a digital asset secured by a golf club NFT can have additional properties, which could include a handedness, a weight, a shaft flexibility, a shaft model, a shaft length, a loft of the club head, etc. Golf club NFTs 802, 804 can be provided to NFT breeding engine 806 to produce a child NFT. NFT breeding engine 806 can use a process or algorithm to generate a child NFT 808, or, alternatively, could deny the breeding request. In some embodiments, the NFT breeding engine 806 could implement the process 820 illustrated in FIG. 9. In some embodiments, the NFT breeding engine 806 could randomly combine properties of the digital assets secured by parent NFTs 802, 804 to produce a child NFT 808 and associated digital asset. For example, as shown, the digital asset secured by child golf club NFT 808 could include properties of the digital assets secured by parent NFT 802, and could be a driver with a cast club head. The digital asset secured by child golf club NFT 808 could additionally have properties of the digital asset secured by parent NFT 804, and could have cosmetic design "Design 2" and have a graphite shaft. In some embodiments, some properties may be a combination of properties of the parents. For example, the design of a digital asset secured by a child NFT can be generated by combining aspects of the designs of the digital assets secured by parent NFTs, and could thus be a new design, for example "Design 3." In this way, a child NFT can be produced and associated with a digital asset with unique characteristics that could enhance the NFT's desirability.

Figure 9:
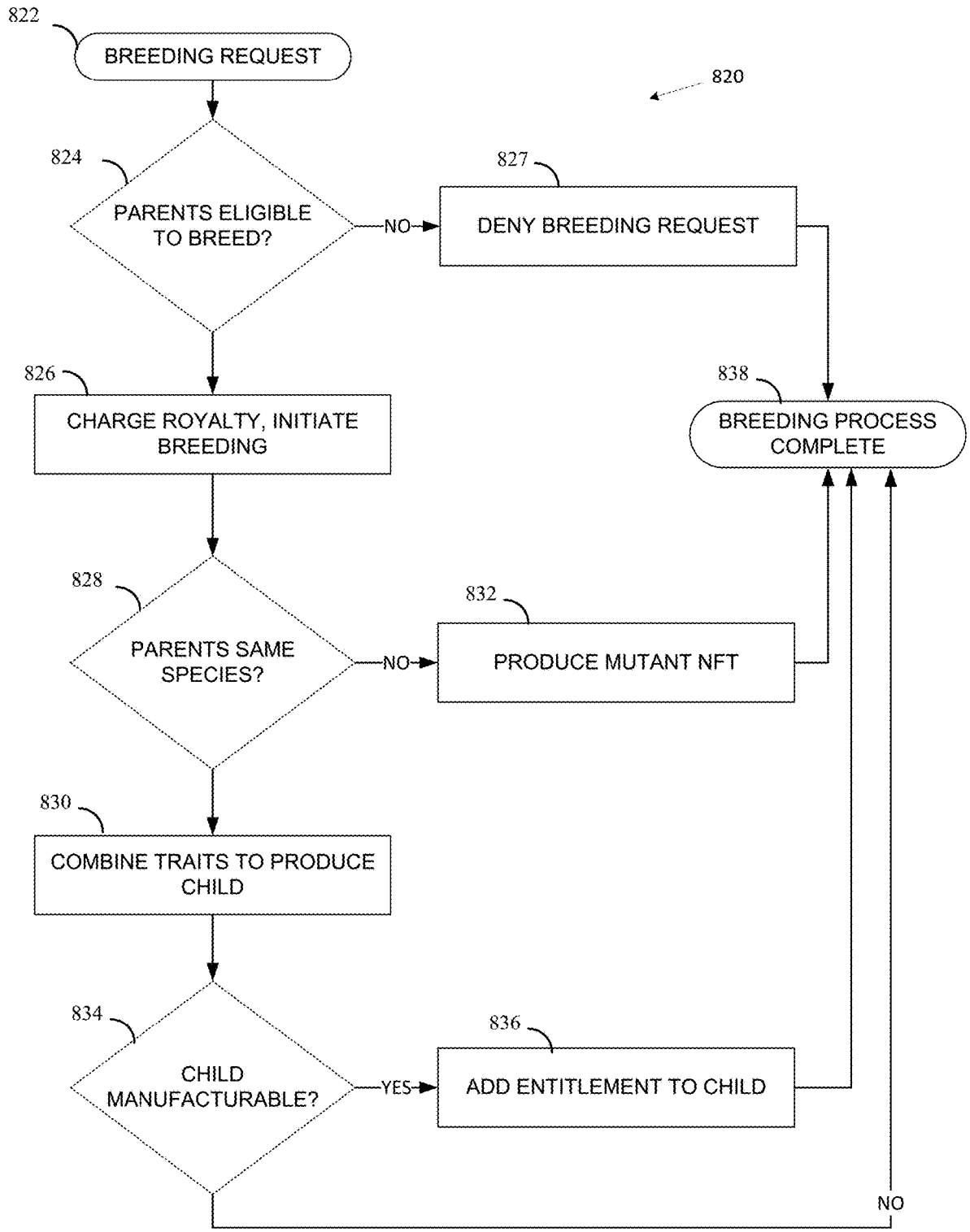
FIG. 9 depicts a flow chart for a breeding process of NFTs according to some embodiments.

FIG. 9 illustrates an exemplary process 820 for breeding an NFT, which can be programmed into the NFT breeding engine 806, and implemented through the use of smart contracts. At step 822, a breeding request can be issued, which can initiate a smart contract, or execution of the process 820. The breeding request can receive the parent NFTs as inputs (e.g., parent golf club NFTs 802, 804 illustrated in FIG. 8). At step 824, the process 820 can check the eligibility of the parent NFTs to breed. Eligibility can be based on a set of conditions. For example, an NFT may only be allowed to breed if it was originally minted by a given manufacturer or retailer, and step 824 may include querying the blockchain to confirm information on the minting of the NFT. Breeding eligibility could additionally be indicated in a parameter of the metadata of the NFT. Additional conditions can be set on breedability to enhance the exclusivity and scarcity of an NFT. An NFT could be eligible to breed only after maturing to a certain age. For example, an NFT could only be breedable after a year of its minting. Wait periods may be imposed between consecutive breedings, so that after an NFT is bred, the NFT is not eligible to breed until after the wait period, which could be a number of days, a number of months, or a number of years. If any of the parent NFTs are ineligible to breed, the request can be denied, as shown in step 827, and the breeding process can complete at step 838. In some embodiments, each prospective parent NFT can be eligible to breed, but they may not be eligible to breed with each other. For example, the process 820 may require that parents be of the same species, or may define certain species that are eligible to breed with other species. By way of example, and not limitation, breeding may be permitted between a golf club NFT and an cosmetic design NFT, but not between a golf club NFT account NFT. In this example, at step 824, a parent golf club NFT and a parent cosmetic design NFT would be eligible at step 824, and would proceed to step 826, while a parent golf club NFT and account NFT would not be eligible to breed at step 824, and the process 820 would proceed to step 827.

If the NFTs are eligible to breed, at step 826 a royalty can be charged, which can provide a revenue stream to the entity that minted the NFT. The royalty can be based on a value of the parent NFTs being bred, or could be a static fee per breeding.

At step 828, the process 820 can check if the parent NFTs are the same species. This can determine the type of NFT produced as a result of the breeding, or the algorithm used to determine properties of the child NFT. A species could be a type of the NFT, which could, for example, be a golf club, an account, an admission ticket, a discount, an early or exclusive access to a digital resource, a limited-edition design or product, a cosmetic design or customization, a proof of attendance, an NFT associated with performance data from a physical or virtual golf tournament, etc. The performance data, which may be referred to as golf tournament performance data when associated with a golf tournament, may include a score, an average shot distance per club type, a number of club type uses, or any other data associated with performance in the golf tournament. A species could also be determined based on a combination of properties of an NFT. For example, a NFT representing a golf club digital asset may only be breedable if the parent golf clubs are the same type of golf club (e.g., a putter, driver, wedge, iron, etc.). NFTs of the same species could include similar properties which may facilitate the mixing of properties to create a child NFT. Conversely, NFTs that are not of the same species may not have the same properties, so that creating a child NFT whose associated digital asset has a combination of features of the digital assets secured by parent NFTs could be infeasible. Thus, if the parent NFTs are not of the same species, at step 832, the process 820 can produce a "mutant" NFT, which could be of a different species than one or more of the parents. In other embodiments, NFTs could only be breedable with other NFTs of the same species, and attempts to perform cross-species would not produce a child NFT. For example, breeding a golf club NFT with an account NFT could produce an NFT providing one-time access to a partition of a digital system (e.g., partition 610B, 610C, 610D illustrated in FIG. 6). Or, breeding a proof of attendance NFT with a golf club NFT could produce an NFT providing access to an event, e.g., similar to benefit 622 shown in FIG. 6. A mutant NFT could provide any of the above-mentioned benefits 612, 614, 616, 618, 620, 622, or could provide a benefit through its own breedability, or could produce a benefit through combination with other NFTs in a user's wallet.

If the parents are of the same species, a child NFT can be produced at step 830, and its associated digital asset can have a combination of the traits of the digital assets associated with parents, as described, for example, with respect to FIG. 8. While the illustrated example of FIG. 8 relates to golf club NFTs, this process can be implemented for NFTs of other products, including, for example, hats, golf balls, gloves, golf bags, shoes, head covers, virtual golf clubs, virtual golf characters, etc. The properties of the child NFT may be assigned randomly, or could be assigned based on an algorithm that weights the properties based on a value of the properties. For example, a given cosmetic feature or design could be more desirable than others, and a breeding process could impose a scarcity of that cosmetic feature or design by decreasing a probability that a child golf club NFT would have that cosmetic feature or design.

At step 834, the process 820 could determine if the digital asset of the child NFT is manufacturable, or if it has characteristics that could practically be produced in a physical product. For example, a digital asset secured by a child golf club NFT could have a shaft length for a given type of golf club, and the manufacturer of the physical golf clubs may not make a golf club of the type and with the shaft length specified in the NFT. When the properties of a digital asset secured by a golf club NFT cannot be matched in a physical golf club, however, the NFT could still allow the owner to use a virtual golf club of the same properties in a digital environment, such as a video game application or metaverse. Additionally, the presence of an NFT could still allow the user to claim benefits based on the number of golf club NFTs in their wallet. Further, the golf club NFT could breed with other golf club NFTs and could produce child NFTs that could themselves correspond to physically manufacturable golf clubs. Thus, an NFT associated with a digital asset having properties that cannot be produced in a physical golf club may not provide a benefit correlating to a physical golf club, and the breeding process can complete. Conversely, if a digital asset of a child golf club NFT has properties that map to an existing product, or that could be practically manufactured, an entitlement can be associated to the NFT at step 836. The entitlement could allow the owner of the child NFT to exchange the NFT for a physical golf club having the same properties as the digital golf club represented by the NFT. In other embodiments, the entitlement could allow the owner to purchase a golf club having the properties of the digital golf club at a discounted rate. Alternatively, the entitlement can provide the owner with an exclusive right to purchase a custom golf club matching the properties specified in the digital asset of the NFT. Once the entitlement has been assigned, the breeding process can complete.

In some embodiments, any suitable computer readable media can be used for storing instructions for performing the functions and/or processes described herein. For example, in some embodiments, computer readable media can be non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media.

The above-described aspects of the processes of FIGS. 5, and 7-9 can be executed or performed in any order or sequence not limited to the order and sequence shown and described in the figures. Also, some of the above aspects of the processes of FIGS. 5 and 7-9 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method of managing digital assets, comprising:
providing a processor and a computing device associated with a first party, wherein the processor is configured to execute at least a portion of a computer program to receive customization inputs from a graphical user interface for customizing a first golf club;
storing, by the processor, an image based on the customization inputs;
generating a first digital asset;
adding a token representing ownership of the first digital asset to a distributed ledger;
transferring, in a first transaction, ownership of the first digital asset a first purchasing party;
transferring, in a second transaction, ownership of a second digital asset to the first purchasing party, the second digital asset including attributes of the first golf club, based on the customization inputs and including the image;
updating the first digital asset to include information about the second transaction;
confirming an ownership by the first purchasing party of the first and second digital assets; and
based on the ownership, providing a first benefit to the owner of the first digital asset,
wherein the first benefit depends on a property of the first digital asset, the second digital asset, or a combination of the first digital asset and the second digital asset.

2. The method of claim 1, wherein the second transaction further includes transferring ownership of the first golf club to the first purchasing party.

3. The method of claim 2, wherein the attributes of the first golf club include data about a manufacturing process used to produce the first golf club.

4. The method of claim 2, wherein the attributes of the first golf club include information about a cosmetic design of the first golf club.

5. The method of claim 2, further comprising providing the second digital asset to a video game application for use by the first purchasing party as a digital golf club.

6. The method of claim 5, wherein a usage data associated with the digital golf club is associated to the second digital asset, and wherein a fourth benefit may be associated to the second digital asset based on the usage data.

7. The method of claim 1, wherein the first digital asset includes information about a plurality of transactions.

8. The method of claim 7, wherein a digital representation of a second benefit is added to the first digital asset based on a digital property of the first digital asset, the digital property including information for at least one transaction of the plurality of transactions.

9. The method of claim 1, wherein the first benefit is one of access to a limited-edition product, a discount, an admission to an event, cosmetic customizations for a product, a third digital asset, or early access to a product.

10. The method of claim 1, wherein the first purchasing party transfers ownership of the first digital asset to a second purchasing party.

11. The method of claim 1, wherein a golf tournament performance data of the first purchasing party is associated to the first digital asset.

12. The method of claim 11, wherein a third benefit is provided to the first purchasing party based on the golf tournament performance data.

13. The method of claim 1, wherein the first benefit is a cosmetic customization for a physical golf club.

* * * * *

UNITED STATES PATENT AND TRADEMARK OFFICE
CERTIFICATE OF CORRECTION

PATENT NO. : 12,321,913 B2
APPLICATION NO. : 17/885878
DATED : June 3, 2025
INVENTOR(S) : Michael T. McDonnell et al.

Page 1 of 1

It is certified that error appears in the above-identified patent and that said Letters Patent is hereby corrected as shown below:

In the Claims

Claim 1, Column 26, Line 5, "asset a first" should be --asset to the first--.

Signed and Sealed this
Twelfth Day of August, 2025

Coke Morgan Stewart
*Acting Director of the United States Patent and Trademark Office*